US012563634B2

(12) United States Patent
Zhang

(10) Patent No.: US 12,563,634 B2
(45) Date of Patent: Feb. 24, 2026

(54) DRX MODE DETERMINING METHOD AND COMMUNICATION APPARATUS

(71) Applicant: Huawei Technologies Co., Ltd., Shenzhen (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 605 days.

(21) Appl. No.: 17/965,146

(22) Filed: Oct. 13, 2022

(65) Prior Publication Data

US 2023/0038791 A1 Feb. 9, 2023

Related U.S. Application Data

(63) Continuation of application No. PCT/CN2021/086012, filed on Apr. 8, 2021.

(30) Foreign Application Priority Data

Apr. 14, 2020 (CN) .......................... 202010290736.2

(51) Int. Cl.
*H04W 76/28* (2018.01)
*H04W 72/0446* (2023.01)

(52) U.S. Cl.
CPC ....... *H04W 76/28* (2018.02); *H04W 72/0446* (2013.01)

(58) Field of Classification Search
CPC .. Y02D 30/70; H04W 76/28; H04W 72/0446; H04W 76/14; H04W 92/20; H04W 28/26
See application file for complete search history.

(56) References Cited

U.S. PATENT DOCUMENTS

2013/0265923 A1* 10/2013 Wang ................ H04W 52/0216
370/311
2017/0070640 A1* 3/2017 Kondoh ............. H04N 1/00344
(Continued)

FOREIGN PATENT DOCUMENTS

CN 107306423 A 10/2017
CN 108307489 A 7/2018
(Continued)

OTHER PUBLICATIONS

English translation of International Search Report (ISR) for PCT/CN2021/086012 (mailed Jun. 29, 2021), retrieved from the Internet Mar. 19, 2025 (Year: 2025).*

(Continued)

*Primary Examiner* — Benjamin H Elliott, IV
(74) *Attorney, Agent, or Firm* — Slater Matsil, LLP

(57) ABSTRACT

A discontinuous reception (DRX) mode determining method and apparatus. The method includes obtaining, by a terminal device, a time domain resource, where the time domain resource is used to transmit sidelink control information and/or sidelink data information, and determining, by the terminal device, a first DRX mode based on the time domain resource, where the first DRX mode comprises an on duration and an off duration. The time domain resource has a first resource set or a second resource set, the first resource set has N resources, and the second resource set includes the periodic first resource set.

15 Claims, 7 Drawing Sheets

(56) References Cited

U.S. PATENT DOCUMENTS

| | | | |
|---|---|---|---|
| 2019/0053159 A1* | 2/2019 | Wei ................... | H04W 52/0235 |
| 2020/0077337 A1 | 3/2020 | Wei et al. | |
| 2021/0297842 A1* | 9/2021 | Shrivastava .......... | H04W 28/24 |
| 2022/0232667 A1* | 7/2022 | Back ..................... | H04W 76/28 |
| 2022/0303901 A1* | 9/2022 | Yang ................ | H04W 52/0216 |
| 2023/0038791 A1* | 2/2023 | Zhang .............. | H04W 72/0446 |
| 2023/0066041 A1* | 3/2023 | Guo ................. | H04W 52/0216 |
| 2023/0082194 A1* | 3/2023 | Liu ................... | H04W 52/0216 |
| 2023/0345559 A1* | 10/2023 | Li ......................... | H04L 1/1812 |
| 2023/0362890 A1* | 11/2023 | Hong ..................... | H04W 4/40 |

FOREIGN PATENT DOCUMENTS

| | | |
|---|---|---|
| CN | 109479189 A | 3/2019 |
| WO | 2018064477 A1 | 4/2018 |

OTHER PUBLICATIONS

"Resource Allocation Enhancements for Mode 2"; Fraunhofer HHI, Fraunhofer IIS; 3GPP TSG RAN WG1 Meeting #103-e R1-2008757 e-Meeting, Oct. 26-Nov. 13, 2020 (Year: 2020).*
"Discussion on resource allocation for power saving"; LG Electronics; 3GPP TSG RAN WG1 Meeting #104-e, Jan. 25-Feb. 5, 2021; R1-2100517 (Year: 2021).*
ZTE, "Discussion on PC5 connection establishment and maintenance", 3GPP TSG-RAN WG2 Meeting #97, R2-1700794, Feb. 13-17, 2017, 4 Pages, Athens, Greece.

* cited by examiner

401
A receive-side terminal device obtains a time domain resource
402
The receive-side terminal device determines a first DRX mode based on the time domain resource
FIG. 4
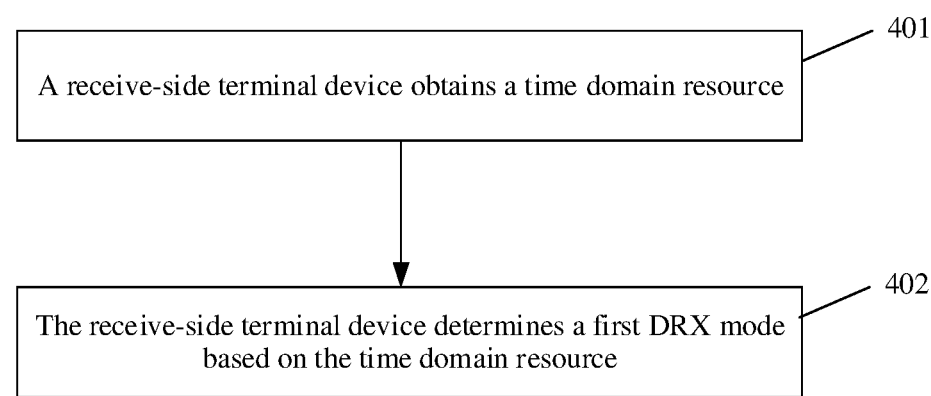
DRX cycle
FIG. 5
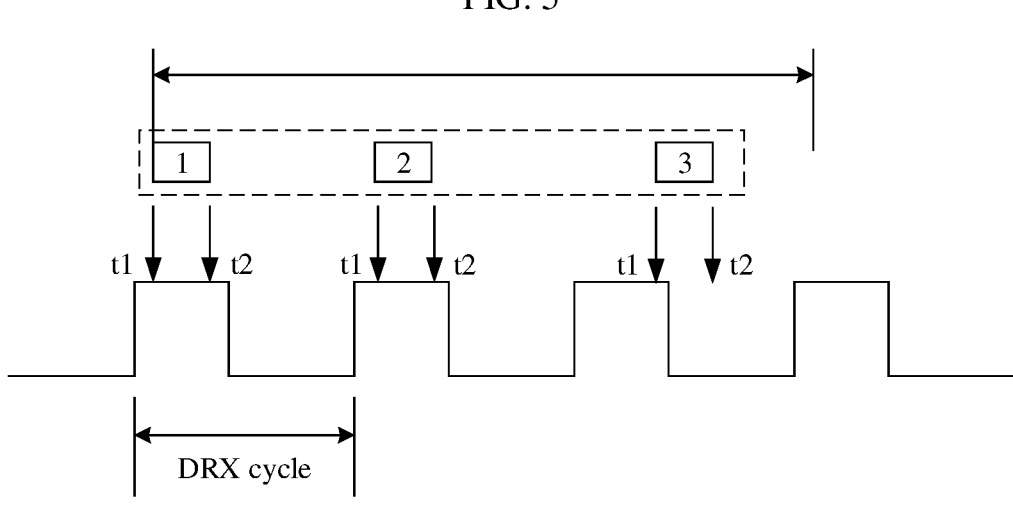
DRX cycle
FIG. 6

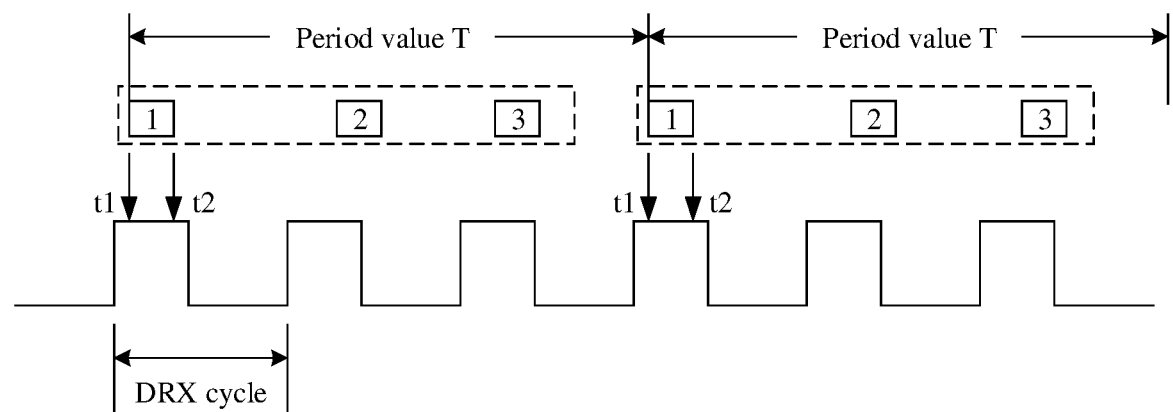
FIG. 9
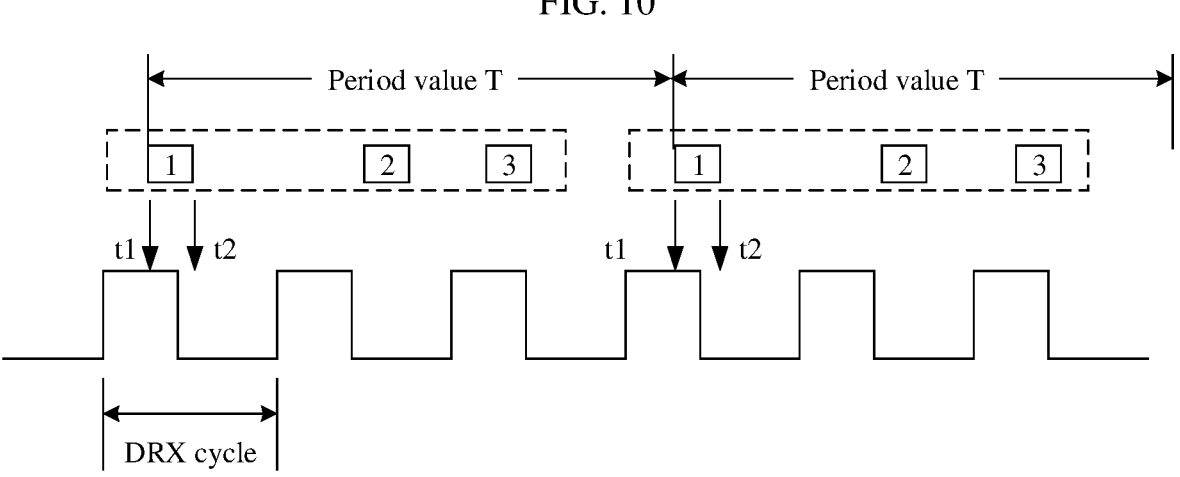
FIG. 10
FIG. 11

DRX MODE DETERMINING METHOD AND COMMUNICATION APPARATUS

CROSS-REFERENCE TO RELATED APPLICATIONS

This application is a continuation of International Application No. PCT/CN2021/086012, filed on Apr. 8, 2021, which claims priority to Chinese Patent Application No. 202010290736.2, filed on Apr. 14, 2020. The disclosures of the aforementioned applications are incorporated herein by reference in their entireties.

TECHNICAL FIELD

Embodiments of this application relate to the field of communication technologies, and in particular, to a Discontinuous Reception (DRX) mode determining method and a communication apparatus.

BACKGROUND

In device-to-device (D2D) communication, a sidelink resource is a resource used for communication between terminal devices. The sidelink resource may include a frequency domain sidelink resource and a time domain sidelink resource.

Currently, a terminal device, for example, a wearable device, in a sidelink is sensitive to power consumption, and how to reduce power consumption of the terminal device becomes an issue that urgently needs to be addressed.

SUMMARY

Embodiments of this application provide a DRX mode determining method and a communication apparatus, to reduce power consumption of a terminal device in a sidelink.

According to a first aspect, an embodiment of this application provides a DRX mode determining method, including: A terminal device obtains a time domain resource, where the time domain resource is used to transmit sidelink control information and/or sidelink data information. The terminal device determines a first discontinuous reception DRX mode based on the time domain resource, where the first DRX mode includes an on duration and an off duration, the time domain resource includes a first resource set or a second resource set, the first resource set includes N resources, the second resource set includes the periodic first resource set, and N is a positive integer. According to this solution, a corresponding DRX mode may be selected based on a reserved time domain resource, where the DRX mode can match the reserved time domain resource, to ensure that the reserved time domain resource can be effectively used. This can improve data transmission efficiency, and can reduce power consumption of the terminal device.

In a possible implementation method, that the terminal device determines a first DRX mode based on the time domain resource includes: The terminal device determines the first DRX mode based on a time domain location of the time domain resource, or the terminal device determines the first DRX mode based on a status of overlapping between the time domain resource and an on duration of a candidate DRX mode, where the status of overlapping includes whether overlapping occurs and/or an overlapping degree. According to this solution, the terminal device may determine a DRX mode based on the time domain location of the time domain resource, or select a DRX mode from the candidate DRX mode based on the status of overlapping between the time domain resource and the on duration of the candidate DRX mode. The on duration of the finally selected first DRX mode can fully or partially cover the time domain location of the time domain resource, so that the reserved time domain resource can be effectively used. This can improve data transmission efficiency, and can reduce power consumption of the terminal device.

In a possible implementation method, the candidate DRX mode includes a DRX mode configured for a sidelink resource pool, or includes a DRX mode configured for a sidelink. According to this solution, a DRX mode may be configured at a granularity of a resource pool, or a DRX mode may be configured at a granularity of a sidelink, so that implementation is flexible.

In a possible implementation method, the time domain resource includes the first resource set, and at least one of the N resources in the first resource set is included in the on duration of the first DRX mode, or the first m symbols of at least one of the N resources in the first resource set overlap the on duration of the first DRX mode. This solution is applicable to an aperiodic service or an aperiodic reserved resource.

In a possible implementation method, the time domain resource includes the second resource set, and the first resource of N resources in a target period in the second resource set is included in the on duration of the first DRX mode, or the first m symbols of the first resource of N resources in a target period in the second resource set overlap the on duration of the first DRX mode.

In a possible implementation method, the target period is at least one of the first Y periods corresponding to the second resource set, and Y is a positive integer. This solution is applicable to a periodic service or a periodic reserved resource.

In a possible implementation method, the terminal device is a receive-side terminal device, and the receive-side terminal device receives indication information from a transmit-side terminal device or a network device, where the indication information is used to indicate a type of a DRX inactivity timer, and the type of the DRX inactivity timer is a first timer or a second timer. Optionally, the first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by the network device or the transmit-side terminal device, and the second duration is determined by the transmit-end terminal device or the receive-end terminal device. Optionally, the second duration is associated with the time domain of the time domain resource or a duration occupied by the time domain resource. According to this solution, the receive-side terminal device may use the first timer or the second timer, so that the DRX inactivity timer can well match the selected first DRX mode and a reserved sidelink resource. This ensures that the reserved time domain resource can fall within the on duration of the first DRX mode to the greatest extent, so that the terminal device can maximize use of the reserved resource, thereby improving resource utilization and communication efficiency.

In a possible implementation method, the terminal device is a transmit-side terminal device, and the transmit-side terminal device sends indication information to a receive-side terminal device, where the indication information is used to indicate a type of a DRX inactivity timer, and the type of the DRX inactivity timer is a first timer or a second timer. Optionally, the first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or the transmit-side terminal device, and the second duration is determined by the transmit-end terminal device or the receive-end terminal device. Optionally, the second duration is associated with the time domain of the time domain resource or a duration occupied by the time domain resource. According to this solution, the transmit-side terminal device determines the type of the to-be-used DRX inactivity timer, and sends the type of the DRX inactivity timer to the receive-side terminal device. In this way, the receive-side terminal device may use the first timer or the second timer, so that the DRX inactivity timer can well match the selected first DRX mode and a reserved sidelink resource. This ensures that the reserved time domain resource can fall within the on duration of the first DRX mode to the greatest extent, so that the terminal device can maximize use of the reserved resource, thereby improving resource utilization and communication efficiency.

In a possible implementation method, the terminal device is a receive-side terminal device or a transmit-side terminal device, and the terminal device determines, based on the status of overlapping between the on duration of the first DRX mode and the time domain resource, to use the first timer or the second timer, where the status of overlapping includes whether overlapping occurs and/or an overlapping degree. Optionally, the first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or the transmit-side terminal device, and the second duration is determined by the transmit-end terminal device or the receive-end terminal device. Optionally, the second duration is associated with the time domain of the time domain resource or a duration occupied by the time domain resource. According to this solution, the transmit-side terminal device or the receive-side terminal device determines the type of the to-be-used DRX inactivity timer based on the status of overlapping between the on duration of the selected first DRX mode and the time domain resource. In this way, the receive-side terminal device may use the first timer or the second timer, so that the DRX inactivity timer can well match the selected first DRX mode and a reserved sidelink resource. This ensures that the reserved time domain resource can fall within the on duration of the first DRX mode to the greatest extent, so that the terminal device can maximize use of the reserved resource, thereby improving resource utilization and communication efficiency.

In a possible implementation method, the terminal device is a transmit-side terminal device, and that a terminal device obtains a time domain resource includes: The terminal device performs detection in a sidelink resource pool to obtain the time domain resource. The method further includes: The transmit-side terminal device sends sidelink control information to a receive-side terminal device, where the sidelink control information includes the time domain resource and indication information, and the indication information is used to indicate the first DRX mode.

According to a second aspect, an embodiment of this application provides a communication method, including: A transmit-side terminal device performs detection in a sidelink resource pool to obtain a time domain resource, where the time domain resource is used to transmit sidelink control information and/or sidelink data information. The transmit-side terminal device determines a first DRX mode based on the time domain resource, where the first DRX mode includes an on duration and an off duration. The transmit-side terminal device sends sidelink control information to a receive-side terminal device, where the sidelink control information includes the time domain resource and indication information, the indication information is used to indicate the first DRX mode, the time domain resource includes a first resource set or a second resource set, the first resource set includes N resources, the second resource set includes the periodic first resource set, and N is a positive integer. According to this solution, a corresponding DRX mode may be selected based on a reserved time domain resource, where the DRX mode can match the reserved time domain resource, to ensure that the reserved time domain resource can be effectively used. This can improve data transmission efficiency, and can reduce power consumption of the terminal device.

According to any implementation method of the first aspect or the second aspect:

In a possible implementation method, the time domain resource is a reserved time domain resource, the N resources included in the first resource set are reserved transmission resources used for one transport block or different transport blocks, and the periodic first resource set included in the second resource set is reserved transmission resources used for different transport blocks.

In a possible implementation method, when the sidelink control information is two-level sidelink control information, first-level sidelink control information includes the time domain resource, and second-level sidelink control information includes the indication information, where the indication information is used to indicate the first DRX mode. This can ensure that a to-be-used DRX mode is indicated while load of the first-level sidelink control information is reduced.

In a possible implementation method, when the sidelink control information is two-level sidelink control information, first-level sidelink control information includes the time domain resource and the indication information, where the indication information is used to indicate the first DRX mode. This can ensure that a to-be-used DRX mode can be learned when the first-level sidelink control information is detected, thereby speeding up processing of the terminal device. The processing includes starting or restarting a timer, or performing judgment on and quickly determining a timer duration.

According to a third aspect, an embodiment of this application provides a communication method, including: A receive-side terminal device receives indication information from a transmit-side terminal device or a network device, where the indication information is used to indicate a type of a DRX inactivity timer, and the type of the DRX inactivity timer is a first timer or a second timer. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by the network device or the transmit-side terminal device, and the second duration is determined by the transmit-end terminal device or the receive-end terminal device. Optionally, the second duration is associated with a time domain of a time domain resource or a duration occupied by the time domain resource. According to this solution, the transmit-side terminal device determines the type of the to-be-used DRX inactivity timer, and sends the type of the DRX inactivity timer to the receive-side terminal device. In this way, the receive-side terminal device may use the first timer or the second timer, so that the DRX inactivity timer can well match the selected first DRX mode and a reserved sidelink resource. This ensures that the reserved time domain resource can fall within the on duration of the first DRX mode to the greatest extent, so that the terminal device can maximize use of the reserved resource, thereby improving resource utilization and communication efficiency.

According to a fourth aspect, an embodiment of this application provides a communication method, including: A transmit-side terminal device sends indication information to a receive-side terminal device, where the indication information is used to indicate a type of a DRX inactivity timer, and the type of the DRX inactivity timer is a first timer or a second timer. According to this solution, the transmit-side terminal device determines the type of the to-be-used DRX inactivity timer, and sends the type of the DRX inactivity timer to the receive-side terminal device. In this way, the receive-side terminal device may use the first timer or the second timer, so that the DRX inactivity timer can well match the selected first DRX mode and a reserved sidelink resource. This ensures that the reserved time domain resource can fall within the on duration of the first DRX mode to the greatest extent, so that the terminal device can maximize use of the reserved resource, thereby improving resource utilization and communication efficiency.

In a possible implementation method, the first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or the transmit-side terminal device, and the second duration is determined by the transmit-end terminal device or the receive-end terminal device. Optionally, the second duration is associated with a time domain of the time domain resource or a duration occupied by the time domain resource.

According to a fifth aspect, an embodiment of this application provides a communication method, including: A terminal device determines, based on a status of overlapping between an on duration of a first DRX mode and a time domain resource, to use a first timer or a second timer, where the status of overlapping includes whether overlapping occurs and/or an overlapping degree. According to this solution, the transmit-side terminal device or the receive-side terminal device determines the type of the to-be-used DRX inactivity timer based on the status of overlapping between the on duration of the selected first DRX mode and the time domain resource. In this way, the receive-side terminal device may use the first timer or the second timer, so that the DRX inactivity timer can well match the selected first DRX mode and a reserved sidelink resource. This ensures that the reserved time domain resource can fall within the on duration of the first DRX mode to the greatest extent, so that the terminal device can maximize use of the reserved resource, thereby improving resource utilization and communication efficiency.

In a possible implementation method, the first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or the transmit-side terminal device, and the second duration is determined by the transmit-end terminal device or the receive-end terminal device. Optionally, the second duration is associated with a time domain of the time domain resource or a duration occupied by the time domain resource. The terminal device is a receive-side terminal device or a transmit-side terminal device.

According to a sixth aspect, an embodiment of this application provides a communication method, including: A terminal device receives at least one DRX mode configured for a sidelink, where the at least one DRX mode configured for a sidelink includes a first DRX mode and a second DRX mode. The terminal device switches from the first DRX mode to the second DRX mode, or the terminal device stops the first DRX mode and starts, restarts, or enables the second DRX mode. According to this solution, one or more DRX modes may be configured for the terminal device, so that the terminal device may select, based on a current operating status, an appropriate DRX mode for switching, so as to achieve an optimal energy saving state and help reduce energy consumption of the terminal device.

In a possible implementation method, before the terminal device switches from the first DRX mode to the second DRX mode, or before the terminal device stops the first DRX mode and starts, restarts, or enables the second DRX mode, the terminal device determines that no SCI is detected within a third timer, and a duration corresponding to the third timer does not include a reserved time domain resource for a sidelink. That is, if the terminal device detects no SCI within the duration in which the third timer is on and the duration does not include a reserved time domain resource for a sidelink, the terminal device may switch from the first DRX mode to the second DRX mode.

In a possible implementation method, an active period of the first DRX mode includes an on duration of the first DRX mode and/or the duration corresponding to the third timer.

In a possible implementation method, the duration of the third timer is a duration that is configured by a network device and that is used for the terminal device to determine whether to remain in the first DRX mode.

In a possible implementation method, an off duration of the second DRX mode is longer than that of the first DRX mode.

According to a seventh aspect, an embodiment of this application provides a communication method, including: A network device sends indication information to a receive-side terminal device, where the indication information is used to indicate a type of a DRX inactivity timer, and the type of the DRX inactivity timer is a first timer or a second timer. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by the network device or a transmit-side terminal device, and the second duration is a duration associated with a time domain resource.

According to an eighth aspect, an embodiment of this application provides a communication method, including: A network device sends at least one DRX mode configured for a sidelink to a terminal device, where the at least one DRX mode configured for a sidelink includes a first DRX mode and a second DRX mode.

According to a ninth aspect, an embodiment of this application provides a communication apparatus. The apparatus may be a terminal device or a chip used for a terminal device. The apparatus has a function of implementing any method in the first aspect to the sixth aspect or in the implementation methods of the first aspect to the sixth aspect. The function may be implemented by hardware, or may be implemented by hardware executing corresponding software. The hardware or the software includes one or more modules corresponding to the function.

According to a tenth aspect, an embodiment of this application provides a communication apparatus. The apparatus may be a terminal device or a chip used for a terminal device. The apparatus has a function of implementing the seventh aspect or the eighth aspect. The function may be implemented by hardware, or may be implemented by hardware executing corresponding software. The hardware or the software includes one or more modules corresponding to the function.

According to an eleventh aspect, an embodiment of this application provides a communication apparatus, including a processor and a memory. The memory is configured to store computer executable instructions. When the apparatus runs, the processor executes the computer executable instructions stored in the memory, so that the apparatus performs any method in the first aspect to the eighth aspect or in the implementation methods of the first aspect to the eighth aspect.

According to a twelfth aspect, an embodiment of this application provides a communication apparatus, including units or means configured to perform steps of any method in the first aspect to the eighth aspect or in the implementation methods of the first aspect to the eighth aspect.

According to a thirteenth aspect, an embodiment of this application provides a communication apparatus, including a processor and an interface circuit. The processor is configured to communicate with another apparatus by using the interface circuit, and perform any method in the first aspect to the eighth aspect or in the implementation methods of the first aspect to the eighth aspect. There are one or more processors.

According to a fourteenth aspect, an embodiment of this application provides a communication apparatus, including a processor, connected to a memory, and configured to invoke a program stored in the memory to perform any method in the first aspect to the eighth aspect or in the implementation methods of the first aspect to the eighth aspect. The memory may be located inside or outside the apparatus. There are one or more processors.

According to a fifteenth aspect, an embodiment of this application further provides a computer-readable storage medium. The computer-readable storage medium stores instructions. When the instructions are run on a computer, the computer is enabled to perform any method in the first aspect to the eighth aspect or in the implementation methods of the first aspect to the eighth aspect.

According to a sixteenth aspect, an embodiment of this application further provides a computer program product. The computer program product includes a computer program. When the computer program is run, any method in the first aspect to the eighth aspect or in the implementation methods of the first aspect to the eighth aspect is performed.

According to a seventeenth aspect, an embodiment of this application further provides a chip system, including a processor, configured to perform any method in the first aspect to the eighth aspect or in the implementation methods of the first aspect to the eighth aspect.

According to an eighteenth aspect, an embodiment of this application further provides a communication system, including a transmit-side terminal device and a receive-side terminal device. The transmit-side terminal device performs detection in a sidelink resource pool to obtain a time domain resource. The transmit-side terminal device determines a first discontinuous reception DRX mode based on the time domain resource, where the first DRX mode includes an on duration and an off duration, the time domain resource includes a first resource set or a second resource set, the first resource set includes N resources, the second resource set includes the periodic first resource set, and N is a positive integer. The transmit-side terminal device sends sidelink control information to the receive-side terminal device, where the sidelink control information includes the time domain resource and indication information, and the indication information is used to indicate the first DRX mode.

According to a nineteenth aspect, an embodiment of this application further provides a communication system, including a transmit-side terminal device and a receive-side terminal device. The terminal device performs detection in a sidelink resource pool to obtain a time domain resource. The transmit-side terminal device sends sidelink control information to the receive-side terminal device, where the sidelink control information includes the time domain resource. The receive-side terminal device determines a first discontinuous reception DRX mode based on the time domain resource, where the first DRX mode includes an on duration and an off duration, the time domain resource includes a first resource set or a second resource set, the first resource set includes N resources, the second resource set includes the periodic first resource set, and N is a positive integer.

BRIEF DESCRIPTION OF THE DRAWINGS

FIG. 4 is a schematic diagram of a DRX mode determining method according to an embodiment of this application;

FIG. 5 shows an example of a first DRX mode;

FIG. 6 shows another example of a first DRX mode;

FIG. 9 shows another example of a first DRX mode;

FIG. 10 shows another example of a first DRX mode;

FIG. 11 shows another example of a first DRX mode;

FIG. 13($a$) shows an example of choosing to use a first timer;

FIG. 13($b$) shows an example of choosing to use a second timer;

DETAILED DESCRIPTION OF ILLUSTRATIVE EMBODIMENTS

Figure 1:
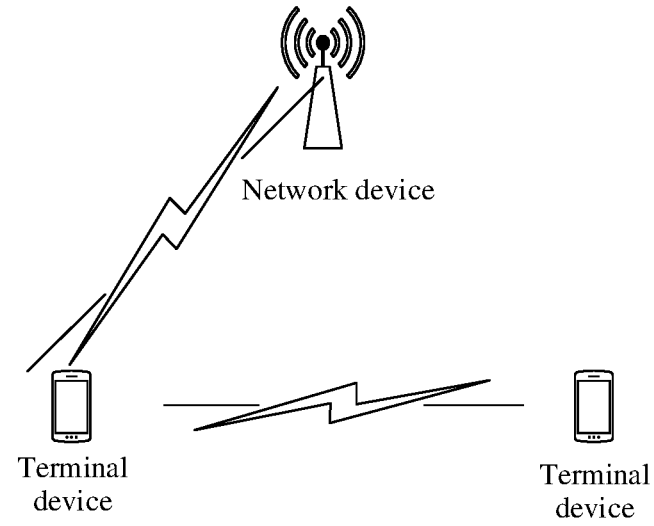
FIG. 1 is a schematic diagram of a network architecture to which an embodiment of this application is applicable.

FIG. 1 is a schematic diagram of a network architecture to which an embodiment of this application is applicable. The network architecture includes a terminal device and a network device. The terminal device may communicate with the network device through a wireless interface.

The terminal device is a device with a wireless transceiver function, and may be deployed on land, including an indoor or outdoor scenario and a handheld or vehicle-mounted scenario, or may be deployed on water (for example, on a steamship), or may be deployed in the air (for example, on an airplane, a balloon, or a satellite). The terminal device may be a mobile phone, a tablet computer (pad), a computer with a wireless transceiver function, a virtual reality (VR) terminal, an augmented reality (AR) terminal, a wireless terminal in industrial control, a wireless terminal in self driving, a wireless terminal in remote medical (remote medical), a wireless terminal in a smart grid, a wireless terminal in transportation safety (transportation safety), a wireless terminal in a smart city, a wireless terminal in a smart home, user equipment (UE), or the like. In this embodiment of this application, direct communication is supported between terminal devices, and the direct communication between terminal devices may also be referred to as D2D communication.

The network device is a device that provides a wireless communication function for the terminal device. The network device includes but is not limited to a next-generation NodeB (g nodeB, gNB) in the fifth generation (5G), an evolved NodeB (evolved node B, eNB), a radio network controller (RNC), a NodeB (node B, NB), a base station controller (base station controller, BSC), a base transceiver station (BTS), a home base station (for example, home evolved nodeB, or home node B, HNB), a baseband unit (BBU), a transmitting and receiving point (TRP), a transmitting point (TP), a mobile switching center, and the like.

When the network device is independently deployed in 5G, a centralized unit (CU) and distributed unit (DU) split mode may be used for a logical system of the network device. Based on configurations of protocol stack functions, the CU-DU logical system may be classified into two types: a CU-DU split architecture and a CU-DU integrated architecture. In the CU-DU split architecture, protocol stack functions may be dynamically configured and split, where some of the functions are implemented in the CU, and remaining functions are implemented in the DU. An ideal transport network and a non-ideal transport network need to be supported to meet requirements of different splitting options. An interface between the CU and the DU needs to meet requirements of 3rd Generation Partnership Project (3GPP) specifications. In the CU-DU integrated architecture, logical functions of the CU and the DU are integrated to one network device, to implement all protocol stack functions.

For ease of understanding embodiments of this application, the following first describes technical terms included in the embodiments of this application.

1. Discontinuous Reception (DRX) Mechanism

In Uu interface-based communication between a terminal device and a network device, the DRX mechanism is introduced to save power for the terminal device. The DRX mechanism is intended to configure a DRX cycle for a terminal device in a radio resource control (RRC) connected state. The DRX cycle includes an "On Duration (a wake period, a wake time, an active period, or a duration)" and an "Opportunity for DRX (an off duration or an off time)". Within a time of the "On Duration", the terminal device listens to and receives a physical downlink control channel (PDCCH). Within a time of the "Opportunity for DRX", the terminal device does not receive PDCCH data to reduce power consumption. The wake period in the DRX cycle may be configured by an onDurationTimer upon notification by signaling.

Figure 2:
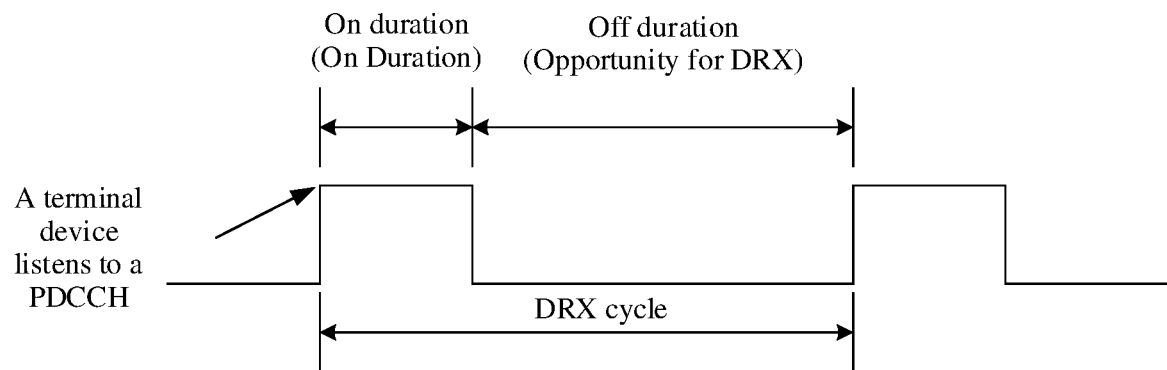
FIG. 2 is a schematic diagram of a DRX cycle.

FIG. 2 is a schematic diagram of a DRX cycle. It can be seen from the figure that time is divided into consecutive DRX cycles (cycle) in time domain. drxStartOffset specifies a start subframe of the DRX cycle, and long DRX Cycle specifies a quantity of subframes occupied by a long DRX cycle. Both parameters are specified by a longDRX-Cycle-StartOffset field. The onDurationTimer timer specifies a quantity of consecutive PDCCH subframes that need to be listened to and that are counted from the start subframe of the DRX cycle (namely, a quantity of consecutive subframes within the on duration).

Generally, after a terminal device is scheduled in a subframe and receives or sends data, the terminal device is very likely to be scheduled again in several subsequent subframes. If the terminal device needs to wait until a next DRX cycle to receive or send the data, an additional delay occurs. Therefore, to reduce the delay, the terminal device remains in an on duration after being scheduled, to be specific, continuously listens to a PDCCH within the con-figured on duration. An implementation mechanism is as follows: Each time the terminal device is scheduled to initially transmit data, a DRX inactivity timer (drxInactivityTimer) is started (or restarted or enabled), and the terminal device remains in an active state until the timer expires. drxInactivityTimer specifies a quantity of consecutive subframes in which the terminal device remains in an active state after the terminal device successfully decodes a PDCCH indicating initially transmitted uplink (UL) or downlink (DL) user data. That is, the timer is restarted each time the terminal device has to-be-initially-transmitted data and is scheduled. It should be noted that initial transmission instead of retransmission is performed herein. Initial transmission is the first transmission of a transport block (TB). Retransmission is each retransmission of a same transport block after the first transmission.

In the application, an on duration in a DRX cycle belongs to an active period, and a timer operating period after drxInactivityTimer is started also belongs to the active period.

Selection of a DXR includes a balance between battery saving and a delay. On the one hand, a long DRX cycle helps extend a battery life of a terminal device. For example, during web page browsing, if the terminal device continuously receives downlink data when a user is reading a downloaded web page, resources are wasted. On the other hand, a shorter DRX cycle enables a faster response when new data is transmitted. For example, the terminal device requests another web page or Voice over Internet Protocol (VoIP).

To meet the foregoing requirements, two DRX cycles may be configured for each terminal device: a short DRX cycle and a long DRX cycle.

2. Sidelink Resource

In embodiments of this application, a sidelink resource may also be referred to as a resource or a transmission resource. In this application, a sidelink may also be referred to as a sidelink, a sidelink, a PC5 interface link, or a link between terminal devices. In this application, a transport block (transmission block) may also be referred to as a data packet. In this application, being greater than/equal to may also be referred to as being greater than or equal to, and being less than/equal to may also be referred to as being less than or equal to.

In D2D communication, a sidelink resource is a resource used for communication between terminal devices. The sidelink resource may include a frequency domain sidelink resource and a time domain sidelink resource. In this application, the time domain sidelink resource in the frequency domain sidelink resource and the time domain sidelink resource is mainly discussed. All sidelink resources appearing subsequently may be time domain sidelink resources. A uniform description is provided herein.

From a perspective of a transmission type, the sidelink resource may include a sidelink sending resource and a sidelink receiving resource. The sidelink sending resource is used to send information, for example, send control information and/or data. The sidelink receiving resource is used to receive information, for example, receive control information and/or data.

Currently, there are two methods for selecting a sidelink resource. In a first method, a network device allocates a resource to a sidelink. In a second method, a transmit-end terminal device selects a reserved sidelink resource from idle resources, and sends sidelink control information (SCI) to a receive-end terminal device, where the SCI carries information used to indicate the reserved sidelink resource. Each time SCI is sent, a maximum of N (N is a positive integer) resources may be reserved, and resources reserved in one piece of SCI are used to transmit one data packet or one transport block. Alternatively, in resources reserved in one piece of SCI, the first resource to the X$^{th}$ resource may be used to transmit one data packet or one transport block, the (X+1)$^{th}$ resource to the N$^{th}$ resource may be used to transmit another data packet or another transport block, where X is a positive integer greater than or equal to 1 and less than or equal to N, and so on. Other resources are not described one by one. Optionally, N is 3 or any integer greater than 3. Optionally, the SCI may further carry a period value. In this case, N resources reserved in one piece of SCI may be repeatedly reserved based on the period value.

It should be noted that resources reserved in different periods are used to transmit different transport blocks. For example, N resources in a first period are used to transmit a transport block 1, N resources in a second period are used to transmit a transport block 2, N resources in a third period are used to transmit a transport block 3, and so on.

Figure 3:
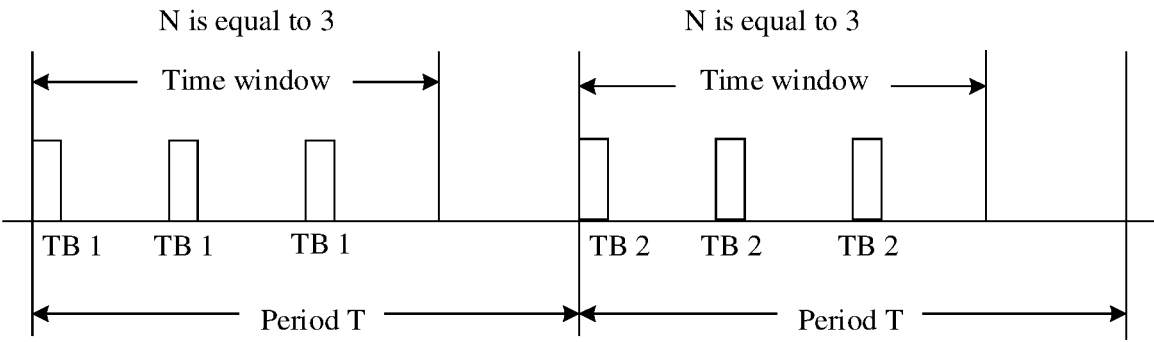
FIG. 3 is a schematic diagram of reserved sidelink resources.

FIG. 3 is a schematic diagram of reserved sidelink resources. There are three reserved sidelink resources in each period. Sidelink resources reserved in a first period are used to transmit a transport block 1 (TB 1), and sidelink resources reserved in a second period are used to transmit a transport block 2 (TB 2). It should be noted that all sidelink resources reserved in each period need to be limited within one time window, that is, the reserved sidelink resources cannot exceed the time window.

To resolve the energy consumption problem of a terminal device in a sidelink that is mentioned in the background, in embodiments of this application, the DRX mechanism is used in a sidelink. When the DRX mechanism is used in the sidelink, the following technical issues need to be addressed. First, how to select a DRX mode to make an on duration of the DRX mode well match a reserved sidelink resource, to ensure that a terminal device can perform monitoring to the greatest extent possible at a time domain location of any reserved resource, and second, how to set a DRX inactivity timer (drxInactivityTimer) to make the DRX inactivity timer well match the DRX mode and the reserved sidelink resource, to ensure that the terminal device can be in the on duration at a time domain location of any reserved resource to perform monitoring.

It should be noted that, in embodiments of this application, a DRX mode includes an on duration and an off duration. drxStartOffset may be used to specify a start subframe of the DRX mode, DRX Cycle may be used to specify a quantity of subframes occupied by the DRX mode, and onDurationTimer may be used to specify a quantity of consecutive PDCCH subframes that need to be listened to and that are counted from the start subframe of the DRX mode (namely, a quantity of consecutive subframes within the on duration). In embodiments of this application, the DRX mode may also be referred to as a DRX pattern, a DRX cycle, a DRX cycle set, a DRX index, a DRX identifier, or DRX.

In this application, a subframe may alternatively be replaced with a slot or a mini-slot. This is not limited.

In embodiments of this application, a preconfigured DRX mode may be configured by a network device for a sidelink by using signaling. For example, the signaling may be radio resource control (RRC) signaling or medium access control (MAC) signaling.

There are many service pairs and service groups in a sidelink, and each service pair or service group has its own service requirement in the sidelink. Therefore, compared with a Uu interface, there are more DRX modes for one on duration length in the sidelink. Alternatively, this may be understood as that, on a Uu interface in a conventional technology, there are only two DRX cycles (or DRX modes) for one on duration length: a long cycle and a short cycle, and in a sidelink, there are two or more DRX modes for one on duration length. It is very important to select an appropriate DRX mode from a plurality of DRX modes for a terminal device to achieve an energy saving effect.

In embodiments of this application, a reserved sidelink resource may also be referred to as a sidelink resource or an allocated sidelink resource. N resources included in a first resource set are reserved transmission resources used for one transport block or different transport blocks. A periodic first resource set included in a second resource set is reserved transmission resources used for different transport blocks.

In embodiments of this application, an on duration of a first DRX mode or an on duration of a first mode is specifically an on duration of a first DRX cycle. Similarly, an on duration of a candidate DRX mode or an on duration of a candidate mode is specifically an on duration of a candidate DRX cycle.

In embodiments of this application, an on duration of a DRX mode may also be referred to as a duration of a DRX mode.

In embodiments of this application, values of m in the first m symbols of the first P resources may be the same or different for any one of the first P resources. This is not limited. To be specific, for any one of the first P resources, m in the first m symbols of the first P resources may be all the same, partially the same, partially different, or all different. Likewise, the first m symbols of the other N–P resources also follow the foregoing rule.

In embodiments of this application, a duration occupied by the first resource in a resource reservation period may be the same as or different from a duration occupied by any other reserved resource in the resource reservation period. A duration occupied by the X$^1$ resource in a resource reservation period may be the same as or different from a duration occupied by any other reserved resource in the resource reservation period.

In embodiments of this application, m in the first m symbols of the first P resources of N resources in a target period may be the same or different for any one of the resources. This is not limited. To be specific, for any one of the resources, m in the first m symbols of the first P resources of the N resources in the target period may be all the same, partially the same, partially different, or all different. Likewise, the first m symbols of the N–P resources other than the P resources also follow the foregoing rule.

In embodiments of this application, P is a positive integer less than or equal to N, and m is a quantity of symbols that is greater than or equal to 1 and less than or equal to a maximum quantity of symbols included in one slot or subframe. Optionally, when one slot includes 14 symbols, m is less than or equal to 14, or when one slot includes 12 symbols, m is less than or equal to 12.

In embodiments of this application, SCI may be understood as being located in the first m symbols of a resource. Optionally, when the SCI is two-level SCI, first-level SCI may be understood as being located in the first m symbols of a resource, or first-level SCI and second-level SCI may be understood as being located in the first m symbols of a resource.

To address the foregoing first issue: how to select a DRX mode to make an on duration of the DRX mode well match a reserved sidelink resource, embodiments of this application provide solutions in Embodiment 1 and Embodiment 2, which are separately described below.

Embodiment 1

In this embodiment, a receive-side terminal device selects a corresponding DRX mode. The receive-side terminal device may select a corresponding DRX mode when DRX of the receive-side terminal device is enabled or when DRX of a terminal device in a sidelink is enabled. Enablement of DRX of the receive-side terminal device may be configured by a network device for a sidelink by using signaling. For example, the signaling may be radio resource control (RRC) signaling or medium access control (MAC) signaling. Alternatively, enablement of DRX of a terminal device in a sidelink may be configured by a network device for the sidelink by using signaling. For example, the signaling may be RRC signaling or MAC signaling. When the DRX of the terminal device in the sidelink is enabled, selection of a DRX mode by the receive-side terminal device in the sidelink may be predefined or specified. In this application, "selecting" and "determining" are interchangeable.

As shown in FIG. 4, this embodiment includes the following steps.

Step 401: The receive-side terminal device obtains a time domain resource.

The time domain resource is a sidelink resource reserved by a transmit-side terminal device, and the time domain resource is used to transmit sidelink control information and/or sidelink data information between the transmit-side terminal device and the receive-side terminal device.

That the receive-side terminal device obtains a time domain resource may also be referred to as that the receive-side terminal device determines a time domain resource. A specific meaning is as follows: The receive-side terminal device receives sidelink control information sent by the transmit-side terminal device, where the sidelink control information includes a reserved sidelink resource, and the receive-side terminal device determines the time domain resource based on the reserved sidelink resource included in the sidelink control information.

The time domain resource may be a periodic or aperiodic time domain resource. For example, when the time domain resource is an aperiodic time domain resource, the time domain resource may be represented as a first resource set, where the first resource set includes N resources. For example, N=3. In this case, the first resource set includes three resources. For another example, when the time domain resource is a periodic time domain resource, the time domain resource may be represented as a second resource set, where the second resource set includes the periodic first resource set. For example, N=3. In this case, the second resource set includes time domain resources of a plurality of periods, and each period includes three time domain resources, or this may be understood as that time domain resources in the second resource set are periodically configured based on every three time domain resources.

In an implementation method, the transmit-side terminal device may send SCI to the receive-side terminal device, where the SCI includes at least N time domain resources and a resource reservation period value T, and N is a positive integer.

In a first case, the resource reservation period value T is 0, indicating that time domain resources are aperiodic, that is, only N time domain resources are reserved, and the first resource set may be used to represent the N reserved time domain resources. The N time domain resources herein may be understood as a maximum quantity of resources (maxNumResource), a value of N may be a parameter configured by a higher layer, and the parameter is less than or equal to a maximum value Nmax.

In a second case, the resource reservation period value T is greater than 0, indicating that time domain resources repeatedly appear periodically, that is, time domain resources whose quantity is a multiple of N are reserved, and the second resource set may be used to represent the reserved time domain resources whose quantity is a multiple of N. Alternatively, this may be understood as that N time domain resources undergo periodic cycling based on the resource reservation period T, where N is a positive integer. The periodic cycling may also be referred to as being repeated periodically, having periodicity, or appearing periodically. In this application, "having periodicity" and "being periodic" are interchangeable.

Step 402: The receive-side terminal device determines a first DRX mode based on the obtained time domain resource, where the first DRX mode includes an on duration and an off duration.

In this application, "based on" may alternatively be replaced with "according to". To be specific, the receive-side terminal device being based on the obtained time domain resource may be replaced with the receive-side terminal device being according to the obtained time domain resource.

In an implementation method, the receive-side terminal device may determine the first DRX mode based on a time domain location of the obtained time domain resource. To be specific, the receive-side terminal device generates a DRX mode based on the time domain location of the reserved time domain resource, where the DRX mode can match the reserved time domain resource.

In another implementation method, the receive-side terminal device may alternatively determine the first DRX mode based on a status of overlapping between the obtained time domain resource and an on duration of a candidate DRX mode, where the status of overlapping includes whether overlapping occurs and/or an overlapping degree. To be specific, the receive-side terminal device selects a DRX mode from a plurality of preconfigured DRX modes as the first DRX mode.

The plurality of preconfigured DRX modes herein may be configured for a sidelink resource pool. Optionally, a DRX mode set may be configured for a sidelink resource pool. After the transmit-side terminal device selects a reserved sidelink resource from the sidelink resource pool, the receive-side terminal device selects a DRX mode from the DRX mode set corresponding to the sidelink resource pool as the to-be-used first DRX mode.

Alternatively, the plurality of preconfigured DRX modes herein may be configured for a sidelink. Optionally, a DRX mode set is configured for any terminal devices (including one transmit-side terminal device and one or more receive-side terminal devices) in a sidelink. After the transmit-side terminal device selects a reserved sidelink resource, the receive-side terminal device selects a DRX mode from the DRX mode set corresponding to the sidelink as the to-be-used first DRX mode.

Alternatively, the plurality of preconfigured DRX modes herein may be configured for a terminal device pair or a terminal device group in a sidelink. Optionally, a DRX mode set is configured for a terminal device pair (including one transmit-side terminal device and one receive-side terminal device). After the transmit-side terminal device selects a reserved sidelink resource, the receive-side terminal device selects a DRX mode from the DRX mode set corresponding to the terminal device pair as the to-be-used first DRX mode. Optionally, a DRX mode set is configured for a terminal device group (including one transmit-side terminal device and a plurality of receive-side terminal devices). After the transmit-side terminal device selects a reserved sidelink resource, the receive-side terminal device selects a DRX mode from the DRX mode set corresponding to the terminal device group as the to-be-used first DRX mode. The terminal device pair may also be referred to as a pair or a communication pair. The terminal device group may also be referred to as a group or a communication group.

Alternatively, the plurality of preconfigured DRX modes herein may be configured for one terminal device in a sidelink. Optionally, a DRX mode set is configured for one terminal device. After the transmit-side terminal device selects a reserved sidelink resource, the receive-side terminal device selects a DRX mode from the DRX mode set corresponding to the terminal device as the to-be-used first DRX mode.

According to the foregoing solution, a corresponding DRX mode may be selected based on the reserved time domain resource, where the DRX mode can match the reserved time domain resource, to ensure that the reserved time domain resource can be effectively used. This can improve data transmission efficiency, and can reduce power consumption of the terminal device.

The following describes manners of selecting a DRX mode in different cases.

Case 1: The reserved time domain resource is an aperiodic resource. That is, the resource reservation period value T is 0.

That the reserved time domain resource is an aperiodic resource may also be understood as that data transmitted between the transmit-side terminal device and the receive-side terminal device is aperiodic. Therefore, the time domain resource obtained in step 401 may be represented as a first resource set, where the first resource set includes N resources.

When the obtained reserved time domain resource is an aperiodic resource, implementation methods for the first DRX mode determined in step 402 include but are not limited to the following implementation methods.

Implementation method 1: At least one of the N resources in the first resource set is included in the on duration of the first DRX mode.

During specific implementation, the implementation method 1 includes but is not limited to the following implementations 1.1 and 1.2.

Implementation 1.1: The first resource of the N resources in the first resource set is included in the on duration of the first DRX mode. The N−1 resources other than the first resource may or may not have an overlapping part with the on duration of the first DRX mode. This is not limited.

Alternatively, this is understood as that the first resource of the N resources needs to meet both the following conditions (1) and (2), including (1) a start moment t1 of the first resource is greater than or equal to M×C, and (2) an end moment t2 of the first resource is less than or equal to M×C+D, where C is a period value of the selected first DRX mode, M is an integer greater than or equal to 0, and D is a duration of the on duration of the first DRX mode.

It should be noted that the end moment t2 of the first resource may also be expressed as t1+duration occupied by the first resource.

FIG. 5 shows an example of the first DRX mode. In this example, the first resource set includes three resources, the first resource is included in one on duration of the first DRX mode, and whether the other two resources are included in the on duration of the first DRX mode is not limited.

Implementation 1.2: The first P resources of the N resources in the first resource set are included in the on duration of the first DRX mode. The N−P resources other than the P resources may or may not have an overlapping part with the on duration of the first DRX mode. This is not limited.

Alternatively, this is understood as that each (which is represented as the $X^{th}$ resource) of the first P resources of the N resources needs to meet both the following conditions (1) and (2), including (1) a start moment t1 of the $X^{th}$ resource is greater than or equal to M×C, and (2) an end moment t2 of the $X^{th}$ resource is less than or equal to M×C+D, where C is a period value of the selected first DRX mode, M is an integer greater than or equal to 0, and D is a duration of the on duration of the first DRX mode.

It should be noted that the end moment t2 of the $X^{th}$ resource may also be expressed as t1+duration occupied by the $X^{th}$ resource.

FIG. 6 shows another example of the first DRX mode. In this example, N=3, and P=2. To be specific, the first resource set includes three resources, the first resource is included in one on duration of the first DRX mode, and the second resource is included in one on duration of the first DRX mode. Whether the third resource is included in the on duration of the first DRX mode is not limited.

Implementation method 2: The first m symbols of at least one of the N resources in the first resource set overlap the on duration of the first DRX mode.

During specific implementation, the implementation method 2 includes but is not limited to the following implementations 2.1 and 2.2.

Implementation 2.1: The first m symbols of the first resource of the N resources in the first resource set are included in the on duration of the first DRX mode. The first m symbols of the N−1 resources other than the first resource may or may not have an overlapping part with the on duration of the first DRX mode. This is not limited.

Alternatively, this is understood as that the first resource of the N resources needs to meet both the following conditions (1) and (2), including (1) a start moment t1 of the first resource is greater than or equal to M×C, and (2) the start moment t1 of the first resource plus a moment (denoted as t2) at which the m$^{th}$ symbol is located is less than or equal to M×C+D, where C is a period value of the selected first DRX mode, M is an integer greater than or equal to 0, and D is a duration of the on duration of the first DRX mode.

Figures 7, 8:
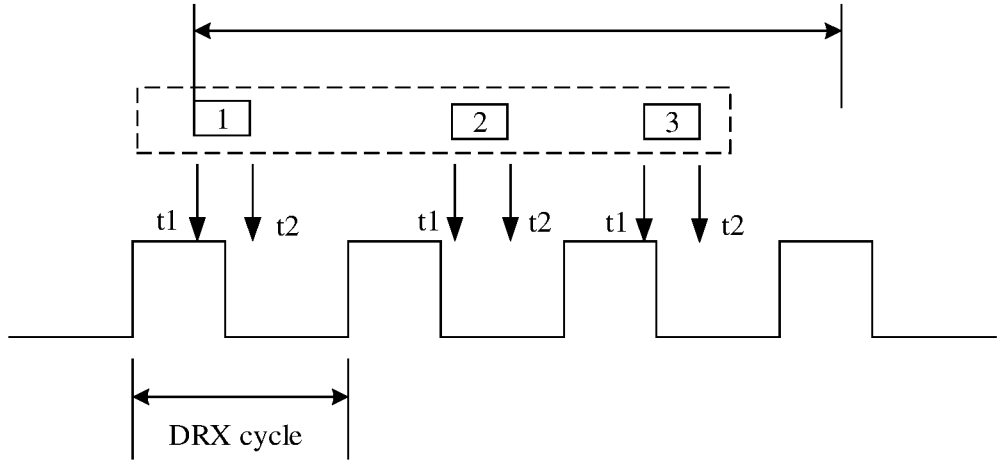
FIG. 7 shows another example of a first DRX mode.
FIG. 8 shows another example of a first DRX mode.

FIG. 7 shows another example of the first DRX mode. In this example, the first resource set includes three resources, the first m symbols of the first resource are included in one on duration of the first DRX mode, and whether the first m symbols of the other two resources are included in the on duration of the first DRX mode is not limited.

Implementation 2.2: The first m symbols of the first P resources of the N resources in the first resource set are included in the on duration of the first DRX mode. The first m symbols of the N–P resources other than the P resources may or may not have an overlapping part with the on duration of the first DRX mode. This is not limited.

Alternatively, this is understood as that the first m symbols of each (which is represented as the X$^{th}$ resource) of the first P resources of the N resources need to meet both the following conditions (1) and (2), including (1) a start moment t1 of the X$^{th}$ resource is greater than or equal to M×C, and (2) the start moment t1 of the X$^{th}$ resource plus a moment (denoted as t2) at which the m$^{th}$ symbol is located is less than or equal to M×C+D, where C is a period value of the selected first DRX mode, M is an integer greater than or equal to 0, and D is a duration of the on duration of the first mode.

FIG. 8 shows another example of the first DRX mode. In this example, N=3, and P=2. To be specific, the first resource set includes three resources, the first m symbols of the first resource are included in one on duration of the first DRX mode, and the first m symbols of the second resource are included in one on duration of the first DRX mode. Whether the first m symbols of the third resource are included in the on duration of the first DRX mode is not limited.

Case 2: The reserved time domain resource is a periodic resource. That is, the resource reservation period value T is greater than 0.

That the reserved time domain resource is a periodic resource may also be understood as that data transmitted between the transmit-side terminal device and the receive-side terminal device is periodic. Therefore, the time domain resource obtained in step 401 may be represented as a second resource set, where the second resource set includes resources of a plurality of periods, and each period includes N resources.

In the application, for a periodic resource included in detected SCI, when the first m symbols of the first resource in the L$^{th}$ resource reservation period overlap an on duration of a next DRX cycle (relative to a current DRX cycle), or the first resource in the L$^{th}$ resource reservation period is included in the on duration of the next DRX cycle, this is referred to as that a resource of the L$^{th}$ resource reservation period is aligned with a resource of the next DRX cycle, where a value of L is 2, . . . , X–1, X, X+1, . . . .

If the X$^{th}$ resource reservation period is the earliest resource reservation period among all resource reservation periods whose resources are aligned with the resource of the next DRX cycle, a target period is X–1 periods from the first resource reservation period to the (X–1)$^{th}$ resource reservation period. Alternatively, if the X$^{th}$ resource reservation period is the only resource reservation period whose resource is aligned with the resource of the next DRX cycle, a target period is X–1 periods from the first resource reservation period to the (X–1)$^{h}$ resource reservation period.

The first m symbols of the first resource in the first resource reservation period overlap an on duration of the current DRX cycle, or the first resource in the first resource reservation period is included in the on duration of the current DRX cycle.

For example, when X=2, the target period is the first period. For another example, when X=3 and resources of both the third period and the fourth period are aligned with the resource of the next DRX cycle, the target period is two periods from the first resource reservation period to the second resource reservation period.

When the obtained reserved time domain resource is a periodic resource, implementation methods for the first DRX mode determined in step 402 include but are not limited to the following implementation methods.

Implementation method 1: At least one of N resources in a target period in the second resource set is included in the on duration of the first DRX mode.

The target period herein is at least one of the first Y periods corresponding to the second resource set. For example, the target period may be the first period of the first Y periods corresponding to the second resource set, or the first period to the Y$^{th}$ period of the first Y periods corresponding to the second resource set, or the first period to the Z$^{th}$ period of the first Y periods corresponding to the second resource set, or any Z periods of the first Y periods corresponding to the second resource set, where Z is a positive integer less than Y.

Optionally, the target period herein may alternatively be at least one of Y periods corresponding to the second resource set. For example, the target period may be the first period of the Y periods corresponding to the second resource set, or the first period to the Y$^{th}$ period of the Y periods corresponding to the second resource set, or the first period to the Z$^{th}$ period of the Y periods corresponding to the second resource set, or any Z periods of the Y periods corresponding to the second resource set, where Z is a positive integer less than Y.

During specific implementation, the implementation method 1 includes but is not limited to the following implementations 1.1 and 1.2.

Implementation 1.1: The first resource of the N resources in the target period in the second resource set is included in the on duration of the first DRX mode. The N–1 resources other than the first resource may or may not have an overlapping part with the on duration of the first DRX mode. This is not limited.

Alternatively, this is understood as that the first resource of the N resources in the target period needs to meet both the following conditions (1) and (2), including (1) a start moment t1 of the first resource is greater than or equal to M×C, and (2) an end moment t2 of the first resource is less than or equal to M×C+D, where C is a period value of the selected first DRX mode, M is an integer, and D is a duration of the on duration of the first mode.

It should be noted that the end moment t2 of the first resource may also be expressed as t1+duration occupied by the first resource.

FIG. 9 shows an example of the first DRX mode. In this example, the second resource set includes resources of two periods, the target period is the two periods, each period includes three resources, the first resource in the target period is included in one on duration of the first DRX mode, and whether the other two resources in the target period are included in the on duration of the first DRX mode is not limited.

Implementation 1.2: The first P resources of the N resources in the target period in the second resource set are included in the on duration of the first DRX mode. The N–P resources other than the P resources may or may not have an overlapping part with the on duration of the first DRX mode. This is not limited.

Alternatively, this is understood as that each (which is represented as the $X^{th}$ resource) of the first P resources of the N resources in the target period needs to meet both the following conditions (1) and (2), including (1) a start moment t1 of the $X^{th}$ resource is greater than or equal to M×C, and (2) an end moment t2 of the $X^{th}$ resource is less than or equal to M×C+D, where C is a period value of the selected first DRX mode, M is an integer, and D is a duration of the on duration of the first DRX mode.

It should be noted that the end moment t2 of the $X^{th}$ resource may also be expressed as t1+duration occupied by the $X^{th}$ resource.

FIG. 10 shows another example of the first DRX mode. In this example, the second resource set includes resources of two periods, the target period is the two periods, N=3, and P=2. To be specific, the target period corresponding to the second resource set includes three resources, the first resource in the target period is included in one on duration of the first DRX mode, and the second resource in the target period is included in one on duration of the first DRX mode. Whether the third resource in the target period is included in the on duration of the first DRX mode is not limited.

Implementation method 2: The first m symbols of at least one of N resources in a target period in the second resource set overlap the on duration of the first DRX mode.

During specific implementation, the implementation method 2 includes but is not limited to the following implementations 2.1 and 2.2.

Implementation 2.1: The first m symbols of the first resource of the N resources in the target period in the second resource set are included in the on duration of the first DRX mode. The first m symbols of the N–1 resources other than the first resource may or may not have an overlapping part with the on duration of the first DRX mode. This is not limited.

Alternatively, this is understood as that the first resource of the N resources in the target period needs to meet both the following conditions (1) and (2), including (1) a start moment t1 of the first resource is greater than or equal to M×C, and (2) the start moment t1 of the first resource plus a moment (denoted as t2) at which the $m^{th}$ symbol is located is less than or equal to M×C+D, where C is a period value of the selected first DRX mode, M is an integer, and D is a duration of the on duration of the first DRX mode.

FIG. 11 shows another example of the first DRX mode. In this example, the second resource set includes resources of two periods, the target period is the two periods, each period includes three resources, the first m symbols of the first resource in the target period are included in one on duration of the first DRX mode, and whether the first m symbols of the other two resources in the target period are included in the on duration of the first DRX mode is not limited.

Implementation 2.2: The first m symbols of the first P resources of the N resources in the target period in the second resource set are included in the on duration of the first DRX mode. The first m symbols of the N–P resources other than the P resources may or may not have an overlapping part with the on duration of the first DRX mode. This is not limited.

Alternatively, this is understood as that the first m symbols of each (which is represented as the $X^{th}$ resource) of the first P resources of the N resources in the target period need to meet both the following conditions (1) and (2), including (1) a start moment t1 of the $X^{th}$ resource is greater than or equal to M×C, and (2) the start moment t1 of the $X^{th}$ resource plus a moment (denoted as t2) at which the $m^{th}$ symbol is located is less than or equal to M×C+D, where C is a period value of the selected first DRX mode, M is an integer, and D is a duration of the on duration of the first mode.

Figures 12, 13A:
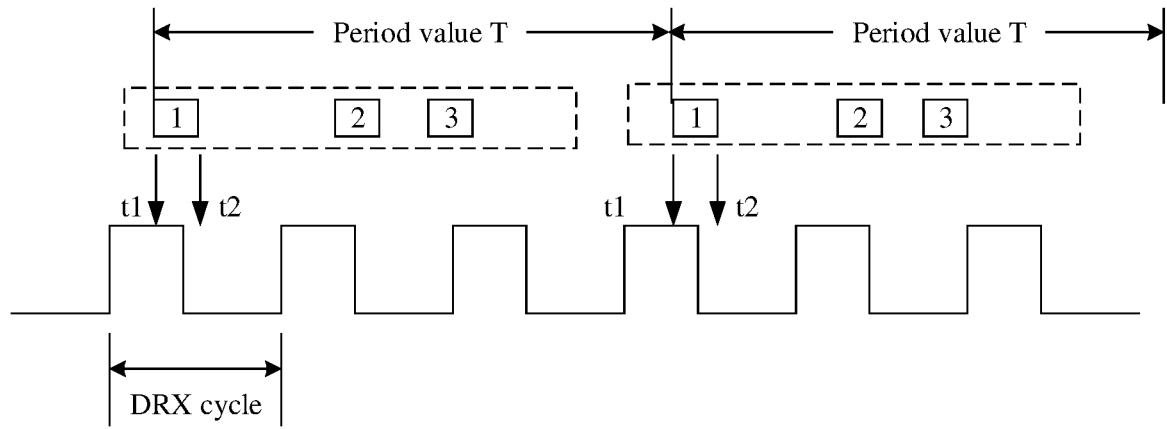
FIG. 12 shows another example of a first DRX mode.

FIG. 12 shows another example of the first DRX mode. In this example, the second resource set includes resources of two periods, the target period is the two periods, N=3, and P=2. To be specific, the second resource set includes three resources in each period, the first m symbols of the first resource in the target period are included in one on duration of the first DRX mode, and the first m symbols of the second resource in the target period are included in one on duration of the first DRX mode. Whether the first m symbols of the third resource in the target period are included in the on duration of the first DRX mode is not limited.

It should be noted that, in the foregoing case 1 or case 2, when a plurality of DRX modes in the preconfigured DRX modes meet a DRX mode selection condition, any one of the plurality of DRX modes that meet the condition may be selected as the selected first DRX mode. Alternatively, a DRX mode whose on duration overlaps the reserved time domain resource most is selected from the plurality of DRX modes that meet the condition as the selected first DRX mode. For the reserved time domain resource, refer to the resources described in the foregoing case 1 or case 2, and the resources are not described one by one again. When none of the plurality of preconfigured DRX modes meets the DRX mode selection condition, the receive-side terminal device may generate a DRX mode that meets the condition, or the transmit-side terminal device reconfigures a reserved time domain resource, to match one or more preconfigured DRX modes.

It should be noted that, in the foregoing case 2, the first m symbols of one resource are required to overlap the on duration of the first DRX mode because the transmit-side terminal device usually adds SCI to the first one or more symbols of each resource. Therefore, it only needs to be ensured that the receive-side terminal device remains in an on duration within a time of the first m symbols of one resource, so that the receive-side terminal device can detect the SCI, and therefore can correctly receive or send data based on control information carried in the SCI. Optionally, when detecting the SCI, the receive-side terminal device may start or restart drxInactivityTimer, to ensure that the receive-side terminal device remains in an on duration during an operating period of the timer, and therefore can correctly receive or send data.

Embodiment 2

A main difference between Embodiment 2 and Embodiment 1 lies in that, in this embodiment, a transmit-side terminal device selects a corresponding DRX mode.

The transmit-side terminal device may select a corresponding DRX mode when DRX of the transmit-side terminal device is enabled or when DRX of a terminal device in a sidelink is enabled. Enablement of DRX of the transmit-end terminal device may be configured by a network device for a sidelink by using signaling. For example, the signaling may be RRC signaling or MAC signaling. Alternatively, enablement of DRX of a terminal device in a sidelink may be configured by a network device for the sidelink by using signaling. For example, the signaling may be RRC signaling or MAC signaling. When the DRX of the terminal device in the sidelink is enabled, selection of a DRX mode by the transmit-side terminal device in the sidelink may be predefined or specified. In this application, "selecting" and "determining" are interchangeable.

Specific implementation methods for determining a first DRX mode by the transmit-side terminal device are the same as the implementation methods for determining the first DRX mode by the receive-side terminal device in Embodiment 1. Details are not described again.

It should be noted that step 401 in this embodiment is as follows: The transmit-side terminal device obtains a time domain resource. The time domain resource is a sidelink resource reserved by the transmit-side terminal device, and the time domain resource is used to transmit sidelink control information and/or sidelink data information between the transmit-side terminal device and a receive-side terminal device.

That the transmit-side terminal device obtains a time domain resource may also be referred to as that the transmit-side terminal device determines a time domain resource, or the transmit-side terminal device detects and determines a time domain resource, or the transmit-side terminal device detects and allocates a time domain resource. The time domain resource is a time domain resource included in a time domain and frequency domain resource that is in a resource pool and that is determined, through detection, to be available. In the application, the detection may be understood as sensing, detecting, or receiving. A specific meaning is as follows: The transmit-side terminal device performs detection in a resource pool used for a sidelink, determines an available time domain and frequency domain resource, and sends sidelink control information to perform sidelink resource reservation on the available time domain and frequency domain resource. Therefore, the sidelink control information includes a reserved sidelink resource. The reserved sidelink resource is a time domain and frequency domain resource that is determined, by the transmit-side terminal device through detection, to be available. In the application, the reserved sidelink resource may also be referred to as a sidelink resource or an allocated sidelink resource.

Step 402 in this embodiment is as follows. The transmit-side terminal device determines the first DRX mode based on the obtained time domain resource, where the first DRX mode includes an on duration and an off duration. The transmit-side terminal device being based on the obtained time domain resource may also be referred to as the transmit-side terminal device being based on the determined time domain resource, or the transmit-side terminal device being based on the detected and determined time domain resource, or the transmit-side terminal device being based on the detected and allocated time domain resource.

After determining the first DRX mode, the transmit-side terminal device needs to notify the receive-side terminal device of the first DRX mode. For example, the transmit-side terminal device may add indication information (for example, a DRX index or a DRX identifier) of the first DRX mode to SCI, and send the SCI to the receive-side terminal device.

To address the foregoing second issue: how to set a DRX inactivity timer (drxInactivityTimer) to make the DRX inactivity timer well match the DRX mode and the reserved sidelink resource, embodiments of this application provide the following solution in Embodiment 3. The solution in Embodiment 3 may be implemented in combination with the solution in Embodiment 1 or Embodiment 2.

Embodiment 3

The following separately provides descriptions with respect to a receive-side terminal device and a transmit-side terminal device.

It should be noted that, in the following descriptions, a first timer is a DRX inactivity timer with a configured duration, or in other words, the first timer is a DRX inactivity timer with a first duration. The configured duration herein is a preconfigured fixed duration, and the first duration is a fixed duration configured by a network device or the transmit-side terminal device (for example, by using RRC signaling or MAC signaling). In this embodiment of this application, the configured duration and the first duration are interchangeable.

For example, each DRX mode corresponds to one first timer. A DRX inactivity timer 1 is configured for a DRX mode 1, a DRX inactivity timer 2 is configured for a DRX mode 2, a DRX inactivity timer 3 is configured for a DRX mode 3, and so on. A duration of the DRX inactivity timer 1, a duration of the DRX inactivity timer 2, and a duration of the DRX inactivity timer 3 each are a preset value, and may be a same preset value or different preset values.

For another example, all sidelink DRX modes correspond to one first timer. A DRX inactivity timer is configured for all sidelink DRX modes, for example, a DRX mode 1, a DRX mode 2, and a DRX mode 3. A duration of the DRX inactivity timer is a preset value.

A second timer is a DRX inactivity timer with a variable duration, or in other words, the second timer is a DRX inactivity timer with a second duration. The variable duration herein is a duration that is flexibly set based on a status of overlapping between a reserved time domain resource and an on duration of a selected DRX mode. The second duration is determined by the transmit-end terminal device or the receive-end terminal device. Optionally, the second duration is associated with a time domain of the time domain resource or a duration occupied by the time domain resource. In this embodiment of this application, the flexible duration and the second duration are interchangeable.

In the following descriptions, in the application, using the first timer is starting or restarting the first timer, and using the second timer is starting or restarting the second timer.

1. With Respect to the Receive-Side Terminal Device

In an implementation method, the receive-side terminal device may receive indication information from the transmit-side terminal device or the network device, where the indication information is used to indicate a type of a DRX inactivity timer, and the type of the DRX inactivity timer is the first timer or the second timer. In the application, the indication information may be one piece of information or a plurality of pieces of different information, in other words, may be one piece of signaling or a plurality of pieces of signaling.

In another implementation method, the receive-side terminal device determines, based on a status of overlapping between an on duration of a first DRX mode and a reserved time domain resource, to use the first timer or the second timer, where the status of overlapping includes whether overlapping occurs and/or an overlapping degree.

For example, in correspondence to the implementation method 1.1 in the case 1 of Embodiment 1 or Embodiment 2, if the N−1 resources other than the first resource overlap the on duration of the first DRX mode and an overlapping part includes at least the first m symbols of the other N–1 resources, the receive-side terminal device uses the first timer, or if none of the N–1 resources other than the first resource overlaps the on duration of the first DRX mode or an overlapping part between the other N–1 resources and the first DRX mode does not include at least the first m symbols of the other N–1 resources, the receive-side terminal device uses the second timer.

For another example, in correspondence to the implementation method 1.2 in the case 1 of Embodiment 1 or Embodiment 2, if the N–P resources other than the P resources overlap the on duration of the first DRX mode and an overlapping part includes at least the first m symbols of the other N–P resources, the receive-side terminal device uses the first timer, or if none of the N–P resources other than the P resources overlaps the on duration of the first DRX mode or an overlapping part between the other N–P resources and the first DRX mode does not include at least the first m symbols of the other N–P resources, the receive-side terminal device uses the second timer, or the receive-side terminal device uses the first timer on the first P–1 resources and uses the second timer on the $P^{th}$ resource. Using the second timer on the $P^{th}$ resource means starting or restarting the second timer after SCI is detected on the $P^{th}$ resource.

For another example, in correspondence to the implementation method 2.1 in the case 1 of Embodiment 1 or Embodiment 2, if the first m symbols of the N–1 resources other than the first resource overlap the on duration of the first DRX mode, the receive-side terminal device uses the first timer, or if the first m symbols of none of the N–1 resources other than the first resource overlap the on duration of the first DRX mode or an overlapping part between the other N–1 resources and the first DRX mode does not include at least the first m symbols of the other N–1 resources, the receive-side terminal device uses the second timer.

For another example, in correspondence to the implementation method 2.2 in the case 1 of Embodiment 1 or Embodiment 2, if the first m symbols of the N–P resources other than the P resources overlap the on duration of the first DRX mode, the receive-side terminal device uses the first timer, or if the first m symbols of none of the N–P resources other than the P resources overlap the on duration of the first DRX mode, the receive-side terminal device uses the second timer, or the receive-side terminal device uses the first timer on the first P–1 resources and uses the second timer on the $P^{th}$ resource. Using the second timer on the $P^{th}$ resource means starting or restarting the second timer after SCI is detected on the $P^{th}$ resource.

A timer selection method corresponding to the implementation method 1.1 in the case 2 of Embodiment 1 or Embodiment 2 is similar to the timer selection method corresponding to the implementation method 1.1 in the case 1 of Embodiment 1 or Embodiment 2. A timer selection method corresponding to the implementation method 1.2 in the case 2 of Embodiment 1 or Embodiment 2 is similar to the timer selection method corresponding to the implementation method 1.2 in the case 1 of Embodiment 1 or Embodiment 2. A timer selection method corresponding to the implementation method 2.1 in the case 2 of Embodiment 1 or Embodiment 2 is similar to the timer selection method corresponding to the implementation method 2.1 in the case 1 of Embodiment 1 or Embodiment 2. A timer selection method corresponding to the implementation method 2.2 in the case 2 of Embodiment 1 or Embodiment 2 is similar to the timer selection method corresponding to the implementation method 2.2 in the case 1 of Embodiment 1 or Embodiment 2. Details are not described again.

2. With Respect to the Transmit-Side Terminal Device

In an implementation method, the transmit-side terminal device determines, based on a status of overlapping between an on duration of a first DRX mode and a reserved time domain resource, to use the first timer or the second timer, where the status of overlapping includes whether overlapping occurs and/or an overlapping degree.

Optionally, the transmit-side terminal device may further send indication information to the receive-side terminal device, where the indication information is used to indicate a type of a DRX inactivity timer, and the type of the DRX inactivity timer is the first timer or the second timer.

With respect to the transmit-side terminal device, timer selection methods corresponding to different implementation methods in the case 1 or the case 2 of Embodiment 1 or Embodiment 2 are similar to the timer selection methods for the receive-side terminal device. Details are not described again.

FIG. 13(a) shows an example of choosing to use the first timer. In this example, because a reserved resource in each resource reservation period is included in an on duration of the first DRX mode, the terminal device (the transmit-side or receive-side terminal device) may use the reserved resource within the on duration. Therefore, the terminal device may choose to use the DRX inactivity timer with the first duration, in other words, choose to use the first timer corresponding to the first DRX mode.

Figures 13B, 14:
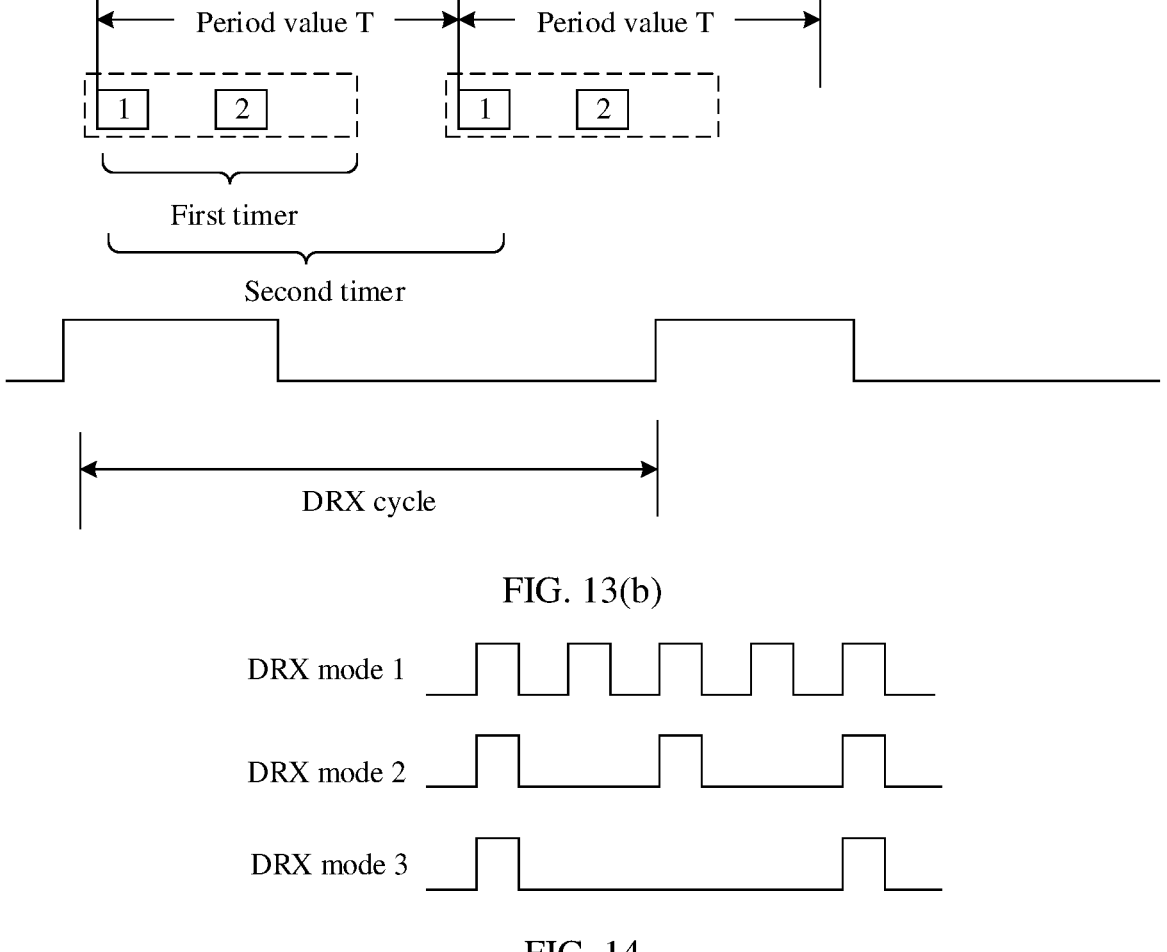
FIG. 14 shows an example of switching between DRX modes.

FIG. 13(b) shows an example of choosing to use the second timer. In this example, a reserved resource in the first period (namely, the first resource reservation period) is included in an on duration of the first DRX mode, but a reserved resource in the second period does not overlap the on duration of the first DRX mode. As a result, within a time corresponding to the reserved resource in the second period, the terminal device is in an off duration, and cannot use the reserved resource in the second period. In addition, if the terminal device uses the first timer, to be specific, uses a preconfigured timer with a fixed duration, the terminal device cannot make the reserved resource in the second period overlap the on duration of the first DRX mode. In this case, the terminal device may choose to use the second timer, in other words, autonomously determine a duration of a DRX inactivity timer. For example, if only the first resource in the second period needs to be included in the on duration of the first DRX mode, a duration of the second timer is required to be equal to a resource reservation period T plus a duration of the first resource in the second period. Certainly, if both the first resource and the second resource in the second period are required to be included in the on duration of the first DRX mode, a duration of the second timer is required to be equal to the resource reservation period T plus a duration between a start moment of the first resource in the second period and an end moment of the second resource in the second period.

Embodiment 4

Embodiment 4 may be implemented in combination with Embodiment 1, Embodiment 2, or Embodiment 3. In this embodiment, a terminal device is allowed to switch between configured DRX modes. The DRX mode configured for a sidelink may include a plurality of DRX modes. For example, the DRX mode configured for a sidelink includes five DRX modes.

In an implementation method, the terminal device receives at least one DRX mode configured for a sidelink, where the at least one DRX mode configured for a sidelink includes a first DRX mode and a second DRX mode. The terminal device switches from the first DRX mode to the second DRX mode, or the terminal device stops the first DRX mode and starts, restarts, or enables the second DRX mode. The first DRX mode or the second DRX mode is not limited to one DRX mode, and may represent a plurality of DRX modes.

For example, when the first DRX mode determined for the terminal device is released (released) or the terminal device expects to switch to a more energy-efficient DRX mode, the terminal device may switch to the second DRX mode, in other words, the second DRX mode is enabled (enabled).

Optionally, before the terminal device switches from the first DRX mode to the second DRX mode, or before the terminal device stops the first DRX mode and starts, restarts, or enables the second DRX mode, the terminal device determines that no SCI is detected within a third timer, and a duration corresponding to the third timer does not include a reserved time domain resource for a sidelink. That is, if the terminal device detects no SCI within the duration in which the third timer is on and the duration does not include a reserved time domain resource for a sidelink, the terminal device may switch from the first DRX mode to the second DRX mode. Optionally, the duration of the third timer is a duration that is configured by a network device and that is used for the terminal device to determine whether to remain in the first DRX mode. Optionally, an off duration of the second DRX mode is longer than that of the first DRX mode, thereby reducing power consumption of the terminal device.

In an implementation method, an active period of the first DRX mode includes an on duration of the first DRX mode and/or the duration corresponding to the third timer.

FIG. 14 shows an example of switching between DRX modes. In this example, a DRX mode 1, a DRX mode 2, and a DRX mode 3 are preconfigured for the terminal device. The DRX mode 1 has a shortest off duration, and the DRX mode 3 has a longest off duration. For example, after the terminal device switches from the DRX mode 1 to the DRX mode 2, energy consumption of the terminal device can be reduced because an off duration is longer.

The foregoing mainly describes the solutions provided in embodiments of this application from the perspective of interaction between network elements. It can be understood that, to implement the foregoing functions, the foregoing network elements include corresponding hardware structures and/or software modules for performing the functions. A person skilled in the art should easily be aware that, in combination with the units and algorithm steps in the examples described in embodiments disclosed in this specification, the application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of the application.

It can be understood that the steps or operations correspondingly implemented by the terminal device in the foregoing method embodiments may alternatively be implemented by a component (for example, a chip or a circuit) configured on the terminal device. An embodiment of this application further provides an apparatus configured to implement any one of the foregoing methods, for example, provides an apparatus including units (or means) configured to implement the steps performed by the terminal device in any one of the foregoing methods.

Figure 15:
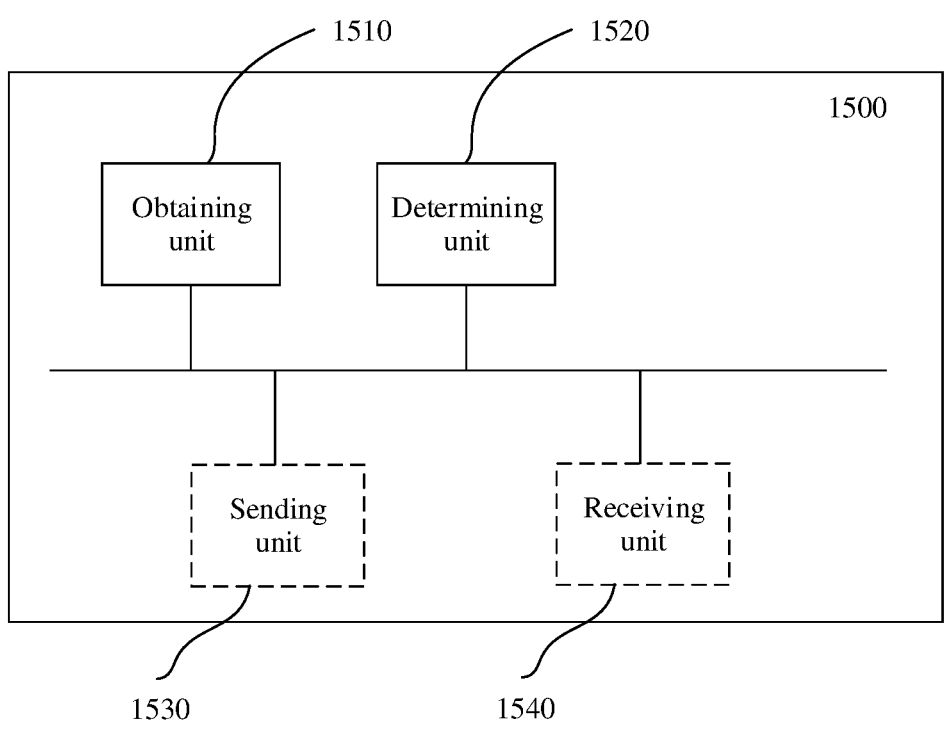
FIG. 15 is a schematic diagram of a communication apparatus according to an embodiment of this application.

FIG. 15 is a schematic diagram of a communication apparatus according to an embodiment of this application. The apparatus is configured to implement steps performed by a corresponding terminal device (for example, the transmit-side terminal device or the receive-side terminal device) in the foregoing method embodiments. As shown in FIG. 15, the apparatus 1500 includes an obtaining unit 1510 and a determining unit 1520. Optionally, the apparatus 1500 further includes a sending unit 1530 and/or a receiving unit 1540.

In a First Embodiment

The obtaining unit 1510 is configured to obtain a time domain resource, where the time domain resource is used to transmit sidelink control information and/or sidelink data information. The determining unit 1520 is configured to determine a first discontinuous reception DRX mode based on the time domain resource, where the first DRX mode includes an on duration and an off duration, the time domain resource includes a first resource set or a second resource set, the first resource set includes N resources, the second resource set includes the periodic first resource set, and N is a positive integer.

In a possible implementation method, the determining unit 1520 is specifically configured to determine the first DRX mode based on a time domain location of the time domain resource, or determine the first DRX mode based on a status of overlapping between the time domain resource and an on duration of a candidate DRX mode, where the status of overlapping includes whether overlapping occurs and/or an overlapping degree.

In a possible implementation method, the candidate DRX mode includes a DRX mode configured for a sidelink resource pool, or includes a DRX mode configured for a sidelink.

In a possible implementation method, the time domain resource includes the first resource set, and at least one of the N resources in the first resource set is included in the on duration of the first DRX mode, or the first m symbols of at least one of the N resources in the first resource set overlap the on duration of the first DRX mode.

In a possible implementation method, the time domain resource includes the second resource set, and the first resource of N resources in a target period in the second resource set is included in the on duration of the first DRX mode, or the first m symbols of the first resource of N resources in a target period in the second resource set overlap the on duration of the first DRX mode, where the target period is at least one of the first Y periods corresponding to the second resource set, and Y is a positive integer.

In a possible implementation method, the communication apparatus is a receive-side terminal device, and the receiving unit 1540 is configured to receive indication information from a transmit-side terminal device or a network device, where the indication information is used to indicate a type of a DRX inactivity timer, and the type of the DRX inactivity timer is a first timer or a second timer. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by the network device or the transmit-side terminal device, and the second duration is determined by the transmit-end terminal device or the receive-end terminal device. Optionally, the second duration is associated with the time domain of the time domain resource or a duration occupied by the time domain resource.

In a possible implementation method, the communication apparatus is a transmit-side terminal device, and the sending unit 1530 is configured to send indication information to a receive-side terminal device, where the indication information is used to indicate a type of a DRX inactivity timer, and the type of the DRX inactivity timer is a first timer or a second timer. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or the transmit-side terminal device, and the second duration is determined by the transmit-end terminal device or the receive-end terminal device. Optionally, the second duration is associated with the time domain of the time domain resource or a duration occupied by the time domain resource.

In a possible implementation method, the communication apparatus is a receive-side terminal device or a transmit-side terminal device, and the determining unit 1520 is further configured to determine, based on a status of overlapping between the on duration of the first DRX mode and the time domain resource, to use a first timer or a second timer, where the status of overlapping includes whether overlapping occurs and/or an overlapping degree. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or the transmit-side terminal device, and the second duration is determined by the transmit-end terminal device or the receive-end terminal device. Optionally, the second duration is associated with the time domain of the time domain resource or a duration occupied by the time domain resource.

In a possible implementation method, the communication apparatus is a transmit-side terminal device, and the obtaining unit 1510 is specifically configured to perform detection in a sidelink resource pool to obtain the time domain resource. The apparatus further includes the sending unit, configured to send sidelink control information to a receive-side terminal device, where the sidelink control information includes the time domain resource and indication information, and the indication information is used to indicate the first DRX mode.

In a possible implementation method, the time domain resource is a reserved time domain resource, the N resources included in the first resource set are reserved transmission resources used for one transport block or different transport blocks, and the periodic first resource set included in the second resource set is reserved transmission resources used for different transport blocks.

In a Second Embodiment

The obtaining unit 1510 is configured to perform detection in a sidelink resource pool to obtain a time domain resource, where the time domain resource is used to transmit sidelink control information and/or sidelink data information. The determining unit 1520 is configured to determine a first DRX mode based on the time domain resource, where the first DRX mode includes an on duration and an off duration. The sending unit 1530 is configured to send sidelink control information to a receive-side terminal device, where the sidelink control information includes the time domain resource and indication information, the indication information is used to indicate the first DRX mode, the time domain resource includes a first resource set or a second resource set, the first resource set includes N resources, the second resource set includes the periodic first resource set, and N is a positive integer.

In a Third Embodiment

The receiving unit 1540 is configured to receive indication information from a transmit-side terminal device or a network device, where the indication information is used to indicate a type of a DRX inactivity timer, and the type of the DRX inactivity timer is a first timer or a second timer. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by the network device or the transmit-side terminal device, and the second duration is determined by the transmit-end terminal device or a receive-end terminal device. Optionally, the second duration is associated with a time domain of a time domain resource or a duration occupied by the time domain resource.

In a Fourth Embodiment

The sending unit 1530 is configured to send indication information to a receive-side terminal device, where the indication information is used to indicate a type of a DRX inactivity timer, and the type of the DRX inactivity timer is a first timer or a second timer. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or a transmit-side terminal device, and the second duration is determined by the transmit-end terminal device or the receive-end terminal device. Optionally, the second duration is associated with a time domain of a time domain resource or a duration occupied by the time domain resource.

In a Fifth Embodiment

The determining unit 1520 is configured to determine, based on a status of overlapping between an on duration of a first DRX mode and a time domain resource, to use a first timer or a second timer, where the status of overlapping includes whether overlapping occurs and/or an overlapping degree. The first timer is a DRX inactivity timer with a configured duration, and the second timer is a DRX inactivity timer with a variable duration, or the first timer is a DRX inactivity timer with a first duration, and the second timer is a DRX inactivity timer with a second duration, where the first duration is configured by a network device or a transmit-side terminal device, and the second duration is determined by the transmit-end terminal device or a receive-end terminal device. Optionally, the second duration is associated with a time domain of the time domain resource or a duration occupied by the time domain resource.

In a Sixth Embodiment

The receiving unit 1540 is configured to receive at least one DRX mode configured for a sidelink, where the at least one DRX mode configured for a sidelink includes a first DRX mode and a second DRX mode, and the determining unit 1520 is configured to switch from the first DRX mode to the second DRX mode, or the terminal device stops the first DRX mode and starts, restarts, or enables the second DRX mode.

In a possible implementation method, the determining unit 1520 is further configured to determine that no SCI is detected within a third timer, and a duration corresponding to the third timer does not include a reserved time domain resource for a sidelink.

In a possible implementation method, an active period of the first DRX mode includes an on duration of the first DRX mode and/or the duration corresponding to the third timer.

In a possible implementation method, the duration of the third timer is a duration that is configured by a network device and that is used for the terminal device to determine whether to remain in the first DRX mode.

In a possible implementation method, an off duration of the second DRX mode is longer than that of the first DRX mode.

It can be understood that the foregoing units may also be referred to as modules, circuits, or the like, and the foregoing units may be disposed independently, or some or all of the units may be integrated.

In a possible implementation method, the sending unit 1530 and the receiving unit 1540 may alternatively be implemented by a transceiver unit, in other words, the sending unit 1530 and the receiving unit 1540 may also be collectively referred to as a transceiver unit. The sending unit 1530, the receiving unit 1540, or the transceiver unit may also be referred to as a communication interface.

Optionally, the communication apparatus 1500 may further include a storage unit. The storage unit is configured to store data or instructions (which may also be referred to as code or a program). The foregoing units may interact with or be coupled to the storage unit, to implement a corresponding method or function. For example, the obtaining unit 1510 and the determining unit 1520 may read the data or the instructions in the storage unit, so that the communication apparatus implements the methods in the foregoing embodiments.

It should be understood that division of the units in the foregoing apparatus is merely logical function division. In actual implementation, all or some of the units may be integrated into one physical entity, or the units may be physically separated. In addition, all the units in the apparatus may be implemented in a form of software invoked by a processing element, or all the units may be implemented in a form of hardware, or some units may be implemented in a form of software invoked by a processing element, and some units may be implemented in a form of hardware. For example, each unit may be an independently disposed processing element, or may be integrated into a chip of the apparatus for implementation, or may be stored in a memory in a form of a program, so that the program is invoked by a processing element of the apparatus to perform a function of the unit. In addition, all or some of the units may be integrated, or the units may be implemented independently. The processing element herein may also be referred to as a processor, and may be an integrated circuit with a signal processing capability. In an implementation process, the steps in the foregoing methods or the foregoing units may be implemented by an integrated logic circuit of hardware in a processing element, or may be implemented in a form of software invoked by a processing element.

In an example, the units in any one of the foregoing apparatuses may be one or more integrated circuits configured to implement the foregoing methods, for example, one or more application-specific integrated circuits (Application Specific Integrated Circuit, ASIC), one or more microprocessors (digital signal processor, DSP), one or more field programmable gate arrays (Field Programmable Gate Array, FPGA), or a combination of at least two of these integrated circuit forms. For another example, when the units in the apparatus may be implemented in a form of a program scheduled by a processing element, the processing element may be a general-purpose processor, for example, a central processing unit (Central Processing Unit, CPU), or another processor capable of invoking the program. For another example, the units may be integrated together and implemented in a form of a system-on-a-chip (system-on-a-chip, SOC).

The foregoing unit used for receiving (for example, the receiving unit) is an interface circuit of the apparatus, and is configured to receiving a signal from another apparatus. For example, when the apparatus is implemented by a chip, the receiving unit is an interface circuit used by the chip to receive a signal from another chip or apparatus. The foregoing unit used for sending (for example, the sending unit) is an interface circuit of the apparatus, and is configured to send a signal to another apparatus. For example, when the apparatus is implemented by a chip, the sending unit is an interface circuit used by the chip to send a signal to another chip or apparatus.

Figure 16:
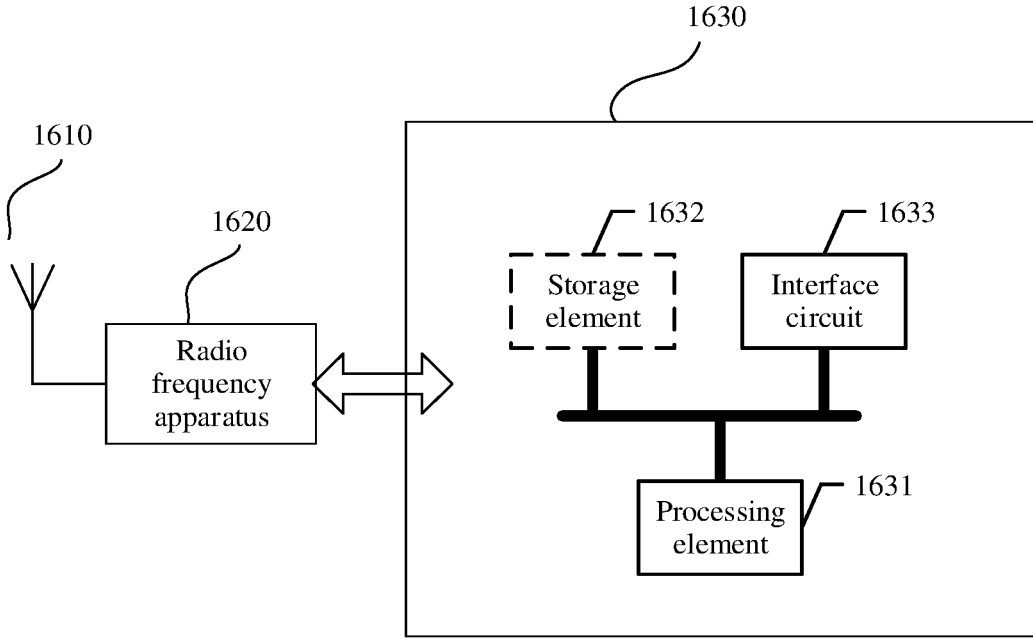
FIG. 16 is a schematic diagram of a terminal device according to an embodiment of this application.

FIG. 16 is a schematic diagram of a structure of a terminal device according to an embodiment of this application. The terminal device is configured to implement the operations performed by the terminal device (for example, the transmit-side terminal device or the receive-side terminal device) in the foregoing embodiments. As shown in FIG. 16, the terminal device includes an antenna 1610, a radio frequency apparatus 1620, and a signal processing part 1630. The antenna 1610 is connected to the radio frequency apparatus 1620. In a downlink direction, the radio frequency apparatus 1620 receives, by using the antenna 1610, information sent by a network device or another terminal device, and sends, to the signal processing part 1630 for processing, the information sent by the network device or the another terminal device. In an uplink direction, the signal processing part 1630 processes information of the terminal device, and sends processed information to the radio frequency apparatus 1620, and the radio frequency apparatus 1620 processes the information of the terminal device, and sends processed information to the network device or the another terminal device by using the antenna 1610.

The signal processing part 1630 is configured to process each communication protocol layer of data. The signal processing part 1630 may be a subsystem of the terminal device. In this case, the terminal device may further include other subsystems, for example, a central processing subsystem, configured to process an operating system and an application layer of the terminal device, and for another example, a peripheral subsystem, configured to implement connection to another device. The signal processing part

1630 may be a chip that is disposed separately. Optionally, the foregoing apparatus may be located in the signal processing part 1630.

The signal processing part 1630 may include one or more processing elements 1631, for example, a main control CPU and other integrated circuits, and include an interface circuit 1633. In addition, the signal processing part 1630 may further include a storage element 1632. The storage element 1632 is configured to store data and a program. A program used to perform the methods performed by the terminal device in the foregoing methods may or may not be stored in the storage element 1632. For example, the program is stored in a memory outside the signal processing part 1630. In use, the signal processing part 1630 loads the program to a cache for use. The interface circuit 1633 is configured to communicate with the apparatus. The foregoing apparatus may be located in the signal processing part 1630. The signal processing part 1630 may be implemented by a chip. The chip includes at least one processing element and an interface circuit. The processing element is configured to perform steps of any method performed by the terminal device. The interface circuit is configured to communicate with another apparatus. In an implementation, the units for implementing the steps in the foregoing methods may be implemented in a form of a program scheduled by a processing element. For example, the apparatus includes a processing element and a storage element, and the processing element invokes a program stored in the storage element to perform the methods performed by the terminal device in the foregoing method embodiments. The storage element may be a storage element located in a same chip as that of the processing element, namely, an on-chip storage element.

In another implementation, the program used to perform the methods performed by the terminal device in the foregoing methods may be in a storage element located on a different chip from that of the processing element, namely, an off-chip storage element. In this case, the processing element invokes or loads the program from the off-chip storage element to an on-chip storage element, to invoke and perform the methods performed by the terminal device in the foregoing method embodiments.

In still another implementation, the units, in the terminal device, for implementing the steps in the foregoing methods may be configured as one or more processing elements, and the processing element is disposed in the signal processing part 1630. The processing element herein may be an integrated circuit, for example, one or more ASICs, one or more DSPs, one or more FPGAs, or a combination of these integrated circuits. The integrated circuits may be integrated together to form a chip.

The units for implementing the steps in the foregoing methods may be integrated together and implemented in a form of a system-on-a-chip (system-on-a-chip, SOC). The SOC chip is configured to implement the foregoing methods. At least one processing element and storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus may include at least one processing element and an interface circuit, where the at least one processing element is configured to perform the method performed by any terminal device in the foregoing method embodiments. The processing element may perform some or all steps performed by the network device in a first manner, to be specific, by invoking the program stored in the storage element, or may perform some or all steps performed by the network device in a second manner, to be specific, by using a hardware integrated logic circuit in the processing element in combination with instructions, or may certainly perform, by combining the first manner and the second manner, some or all steps performed by the network device.

As described above, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing method. The storage element may be one memory, or may be a general term of a plurality of storage elements.

A person of ordinary skill in the art can understand that various numbers such as the first, the second, and the third in this application are merely used for differentiation for ease of description, and are not intended to limit the scope of embodiments of this application or indicate a chronological order. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects. "At least one" means one or more. At least two means two or more. "At least one", "any one", or a similar expression thereof indicates any combination of the items, including any combination of one or more of the items. For example, at least one item (piece) of a, b, and c may indicate: a, b, c, a and b, a and c, b and c, or a, b, and c, where a, b, and c may be singular or plural. "Plurality" means two or more, and other quantifiers are similar.

It should be understood that sequence numbers of the foregoing processes do not mean execution sequences in various embodiments of this application. The execution sequences of the processes should be determined according to functions and internal logic of the processes, but should not be construed as any limitation on the implementation processes of embodiments of the application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division, or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logical units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an electrically programmable ROM (EPROM), an electrically erasable programmable ROM (EEPROM), a register, a hard disk, a removable hard disk, a CD-ROM, or any other form of storage medium in the art. For example, the storage medium may connect to a processor, so that the processor can read information from the storage medium and write information into the storage medium. Optionally, the storage medium may alternatively be integrated into the processor. The processor and the storage medium may be disposed in an ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or a special-purpose computer.

Although this application is described with reference to specific features and all embodiments thereof, it is clear that various modifications and combinations may be made to them without departing from the scope of this application. Correspondingly, this specification and the accompanying drawings are merely example description of this application defined by the appended claims, and are considered as any or all of modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A method, comprising:
obtaining, by a terminal device, a time domain resource, wherein the time domain resource is used to transmit at least one of sidelink control information or sidelink data information; and
determining, by the terminal device, a first discontinuous reception (DRX) mode based on the time domain resource,
wherein the first DRX mode comprises an on duration and an off duration;
wherein the terminal device is a receive-side terminal device, and the method further comprises: receiving, by the receive-side terminal device, indication information from a transmit-side terminal device or a network device; or, wherein the terminal device is the transmit-side terminal device, and the method further comprises sending, by the transmit-side terminal device, the indication information to the receive-side terminal device;
wherein the indication information indicates a type of a DRX inactivity timer, and the type of the DRX inactivity timer is a first timer or a second timer;
wherein the first timer is a first DRX inactivity timer with a configured duration, and the second timer is a second DRX inactivity timer with a variable duration; or wherein the first timer is a first DRX inactivity timer with a first duration, and the second timer is a second DRX inactivity timer with a second duration, the first duration is configured by the network device or the transmit-side terminal device, and the second duration is determined by the transmit-side terminal device or the receive-side terminal device; and wherein the time domain resource comprises a first resource set or a second resource set, wherein the first resource set comprises N resources, wherein the second resource set comprises the first resource set, and wherein N is a positive integer.

2. The method according to claim 1, wherein the determining, by the terminal device, the first DRX mode based on the time domain resource comprises:

determining, by the terminal device, the first DRX mode based on a time domain location of the time domain resource; or determining, by the terminal device, the first DRX mode based on a status of overlapping between the time domain resource and a corresponding on duration of a candidate DRX mode, wherein the status of the overlapping comprises at least one of whether the overlapping occurs or an overlapping degree.

3. The method according to claim 2, wherein the candidate DRX mode comprises a DRX mode configured for a sidelink resource pool, or wherein the candidate DRX mode comprises a DRX mode configured for a sidelink.

4. The method according to claim 1, wherein the time domain resource comprises the first resource set, and wherein the on duration of the first DRX mode comprises at least one of the N resources in the first resource set, or a first m symbols of at least one of the N resources in the first resource set overlap the on duration of the first DRX mode.

5. The method according to claim 1, wherein the time domain resource comprises the second resource set, and wherein the on duration of the first DRX mode comprises a first resource of the N resources in a target period in the second resource set, or a first m symbols of the first resource of the N resources in a target period in the second resource set overlap the on duration of the first DRX mode, wherein the target period is at least one of first Y periods corresponding to the second resource set, and Y is a positive integer.

6. An apparatus, comprising:

at least one processor; and a memory storing programming, the programming including instructions that, when executed by the at least one processor, cause the apparatus to perform:

obtaining a time domain resource, wherein the time domain resource is used to transmit at least one of sidelink control information or sidelink data information; and determining a first discontinuous reception (DRX) mode based on the time domain resource, wherein the first DRX mode comprises an on duration and an off duration;

wherein the apparatus is a receive-side terminal device, and the instructions further cause the apparatus to perform receiving indication information from a transmit-side terminal device or a network device; or, wherein the apparatus is the transmit-side terminal device, and the instructions further cause the apparatus to perform sending the indication information to the receive-side terminal device;

wherein the indication information indicates a type of a DRX inactivity timer, and the type of the DRX inactivity timer is a first timer or a second timer;

wherein the first timer is a first DRX inactivity timer with a configured duration, and the second timer is a second DRX inactivity timer with a variable duration; or wherein the first timer is a first DRX inactivity timer with a first duration, and the second timer is a second DRX inactivity timer with a second duration, the first duration is configured by the network device or the transmit-side terminal device, and the second duration is determined by the transmit-side terminal device or the receive-side terminal device; and wherein the time domain resource comprises a first resource set or a second resource set, the first resource set comprises N resources, the second resource set comprises the first resource set, and N is a positive integer.

7. The apparatus according to claim 6, wherein the determining the first DRX mode comprises:

determining the first DRX mode based on a time domain location of the time domain resource; or determining the first DRX mode based on a status of overlapping between the time domain resource and a corresponding on duration of a candidate DRX mode, wherein the status of the overlapping comprises at least one of whether the overlapping occurs or an overlapping degree.

8. The apparatus according to claim 7, wherein the candidate DRX mode comprises a DRX mode configured for a sidelink resource pool, or wherein the candidate DRX mode comprises a DRX mode configured for a sidelink.

9. The apparatus according to claim 6, wherein the time domain resource comprises the first resource set, and wherein the on duration of the first DRX mode comprises at least one of the N resources in the first resource set, or a first m symbols of at least one of the N resources in the first resource set overlap the on duration of the first DRX mode.

10. The apparatus according to claim 6, wherein the time domain resource comprises the second resource set, and wherein the on duration of the first DRX mode comprises a first resource of the N resources in a target period in the second resource set, or a first m symbols of the first resource of the N resources in a target period in the second resource set overlap the on duration of the first DRX mode, wherein the target period is at least one of first Y periods corresponding to the second resource set, and Y is a positive integer.

11. A non-transitory computer-readable storage medium having instructions stored thereon that, when executed by an apparatus, cause the apparatus to perform operations, the operations comprising:

obtaining a time domain resource, wherein the time domain resource is used to transmit at least one of sidelink control information or sidelink data information; and determining a first discontinuous reception (DRX) mode based on the time domain resource, wherein the first DRX mode comprises an on duration and an off duration;

wherein the apparatus is a receive-side terminal device, and the operations further comprise receiving indication information from a transmit-side terminal device or a network device; or, wherein the apparatus is the transmit-side terminal device, and the operations further comprise sending the indication information to the receive-side terminal device;

wherein the indication information indicates a type of a DRX inactivity timer, and the type of the DRX inactivity timer is a first timer or a second timer;

wherein the first timer is a first DRX inactivity timer with a configured duration, and the second timer is a second DRX inactivity timer with a variable duration; or wherein the first timer is a first DRX inactivity timer with a first duration, and the second timer is a second DRX inactivity timer with a second duration, the first duration is configured by the network device or the transmit-side terminal device, and the second duration is determined by the transmit-side terminal device or the receive-side terminal device; and wherein the time domain resource comprises a first resource set or a second resource set, the first resource set comprises N resources, the second resource set comprises the first resource set, and N is a positive integer.

12. The non-transitory computer-readable storage medium according to claim 11, wherein the determining the first DRX mode based on the time domain resource comprises:

determining the first DRX mode based on a time domain location of the time domain resource; or determining the first DRX mode based on a status of overlapping between the time domain resource and a corresponding on duration of a candidate DRX mode, wherein the status of the overlapping comprises at least one of whether the overlapping occurs or an overlapping degree.

13. The non-transitory computer-readable storage medium according to claim 12, wherein the candidate DRX mode comprises a DRX mode configured for a sidelink resource pool, or wherein the candidate DRX mode comprises a DRX mode configured for a sidelink.

14. The non-transitory computer-readable storage medium according to claim 11, wherein the time domain resource comprises the first resource set, and wherein the on duration of the first DRX mode comprises at least one of the N resources in the first resource set, or a first m symbols of at least one of the N resources in the first resource set overlap the on duration of the first DRX mode.

15. The non-transitory computer-readable storage medium according to claim 11, wherein the time domain resource comprises the second resource set, and wherein the on duration of the first DRX mode comprises a first resource of the N resources in a target period in the second resource set, or a first m symbols of the first resource of the N resources in a target period in the second resource set overlap the on duration of the first DRX mode, wherein the target period is at least one of first Y periods corresponding to the second resource set, and Y is a positive integer.

* * * * *